(12) United States Patent
Huh et al.

(10) Patent No.: US 9,715,149 B2
(45) Date of Patent: *Jul. 25, 2017

(54) LIQUID CRYSTAL DISPLAY COMPRISING A FIRST ELECTRODE HAVING A PLURALITY OF BRANCH ELECTRODES AND A WING CONNECTED TO AN END OF A BRANCH ELECTRODE

(71) Applicant: Samsung Display Co., Ltd., Yongin-si (KR)

(72) Inventors: Soo Jeong Huh, Suwon-si (KR); Dong Wook Kim, Seoul (KR); Seung Hyun Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,867

(22) Filed: Jun. 24, 2016

(65) Prior Publication Data
US 2016/0306238 A1 Oct. 20, 2016

Related U.S. Application Data

(63) Continuation of application No. 13/837,114, filed on Mar. 15, 2013, now Pat. No. 9,383,612.

(30) Foreign Application Priority Data

Nov. 30, 2012 (KR) .......................... 10-2012-0138216

(51) Int. Cl.
| | | |
|---|---|---|
| G02F 1/1368 | (2006.01) | |
| G02F 1/1343 | (2006.01) | |
| G02F 1/1337 | (2006.01) | |
| G02F 1/1333 | (2006.01) | |
| G02F 1/1335 | (2006.01) | |
| G02F 1/1362 | (2006.01) | |
| G06F 3/041 | (2006.01) | |

(52) U.S. Cl.
CPC ...... *G02F 1/134309* (2013.01); *G02F 1/1368* (2013.01); *G02F 1/13338* (2013.01);
(Continued)

(58) Field of Classification Search
CPC .............. G02F 2001/134372; G02F 2201/123
See application file for complete search history.

(56) References Cited

U.S. PATENT DOCUMENTS 8,599,349 B2   12/2013  Chang et al.
9,383,612 B2 * 7/2016   Huh ................ G02F 1/133707
(Continued)

FOREIGN PATENT DOCUMENTS

CN    101086592    12/2007
CN    100416387    9/2008
(Continued)

OTHER PUBLICATIONS

Non-Final Office Action issued on Nov. 12, 2015 in U.S. Appl. No. 13/837,114.
(Continued)

*Primary Examiner* — Paul Lee
(74) *Attorney, Agent, or Firm* — H.C. Park & Associates, PLC

(57) ABSTRACT

A liquid crystal display including a first substrate facing a second substrate, a liquid crystal layer disposed between the first substrate and the second substrate, a first field generating electrode on the first substrate, and a second field generating electrode on the first substrate and including a plurality of branch electrodes overlapped with the first field generating electrode. The second field generating electrode includes a wing connected to an end of a first branch electrode positioned at an outermost side the plurality of branch electrodes.

9 Claims, 25 Drawing Sheets

(52) U.S. Cl.
CPC .... *G02F 1/13439* (2013.01); *G02F 1/133345* (2013.01); *G02F 1/133514* (2013.01); *G02F 1/133707* (2013.01); *G02F 1/133784* (2013.01); *G02F 1/134363* (2013.01); *G02F 1/136227* (2013.01); *G02F 1/136286* (2013.01); *G06F 3/0412* (2013.01); *G02F 2001/134372* (2013.01); *G02F 2201/121* (2013.01); *G02F 2201/123* (2013.01)

(56) References Cited

U.S. PATENT DOCUMENTS

| | | |
|---|---|---|
| 2007/0279567 A1 | 12/2007 | Matsushima |
| 2009/0296037 A1 | 12/2009 | Tanaka et al. |
| 2012/0127409 A1* | 5/2012 | Imayama .............. G02F 1/1368 349/133 |
| 2012/0188496 A1 | 7/2012 | Nomura et al. |
| 2012/0218501 A1 | 8/2012 | Lee et al. |

FOREIGN PATENT DOCUMENTS

| | | |
|---|---|---|
| CN | 102200664 | 9/2011 |
| CN | 102566162 | 7/2012 |
| JP | 2010-009004 | 1/2010 |
| JP | 2010-256547 | 11/2010 |

OTHER PUBLICATIONS

Notice of Allowance issued on Mar. 2, 2016 in U.S. Appl. No. 13/837,114.

* cited by examiner

FIG. 9

| Resolution (PPI) | Pixel Parameter | | Generation status of Bruising | |
|---|---|---|---|---|
| | W4(μm) | W1(μm) | W4 × W1 | Bruising or not |
| 264 | 20.5 | 3.5 | 71.75 | Generation |
| 264 | 25.25 | 2.5 | 63.12 | Generation |
| 264 | 27.25 | 3 | 81.75 | Generation |
| 264 | 23.75 | 3 | 71.25 | Generation |
| 10.1WQ | 16 | 3 | 48 | Generation |
| 160 | 45.25 | 3.5 | 158.37 | No generation |
| 150 | 50.5 | 3.5 | 176.75 | No generation |
| 132 | 54.5 | 4 | 218 | No generation |
| 100 | 79.5 | 4 | 318 | No generation |

LIQUID CRYSTAL DISPLAY COMPRISING A FIRST ELECTRODE HAVING A PLURALITY OF BRANCH ELECTRODES AND A WING CONNECTED TO AN END OF A BRANCH ELECTRODE

CROSS-REFERENCE TO RELATED APPLICATIONS

This application is a continuation of U.S. patent application Ser. No. 13/837,114 filed on Mar. 15, 2013, which claims priority from and the benefit of Korean Patent Application No. 10-2012-0138216, filed on Nov. 30, 2012, which are hereby incorporated by references for all purposes as if fully set forth herein.

BACKGROUND OF THE INVENTION

Field of the Invention

Exemplary embodiments of present invention relate to a liquid crystal display, and to a liquid crystal display capable of reducing deterioration of display quality.

Discussion of the Background

A conventional liquid crystal display includes two panel sheets with field generating electrodes, such as a pixel electrode, a common electrode, and a liquid crystal layer disposed between the two panel sheets. The liquid crystal display generates an electric field, in the liquid crystal layer, by applying a voltage to the field generating electrodes. The electric field determines the direction of liquid crystal molecules of the liquid crystal layer, thus controlling polarization of incident light to display images. Transmittance of the liquid crystal display may be increased when the liquid crystal molecules are controlled.

Each pixel electrode of the liquid crystal display is connected to a switching element connected with signal lines such as a gate line and a data line. The switching element is a three-terminal element, such as a thin film transistor, and transfers a data voltage to the pixel electrode through an output terminal.

The pixel electrode and the common electrode that generate the electric field in the liquid crystal layer of the liquid crystal display may be provided in one display panel with the switching element. One of the pixel electrode and the common electrode of the liquid crystal display includes a plurality of branch electrodes. The other one of the pixel electrode and the common electrode may be formed in a plane shape. When the electric field is generated in the liquid crystal layer, alignment directions of the liquid crystal molecules of the liquid crystal layer are determined by a fringe field between the branch electrodes and the planar-shaped electrode.

In some cases, the liquid crystal display may also include a touch detecting function that may detect interaction with a user, in addition to a display function. A touch detecting sensor may be embedded in the liquid crystal display or attached to the display panel of the liquid crystal display. In the case of the liquid crystal display having the touch detecting function, when the user touches the display panel with a finger or a touch pen, pressure may be applied to the display panel.

When the pressure is applied to the display panel, the alignment of the liquid crystal molecules may be in a state of disorder. When the pressure is released, the liquid crystal molecules may not be restored to the original state, which influences the alignment of the adjacent liquid crystal molecules, and as a result, a display defect, such as a bruising, may occur.

In addition, to reduce a weight of the liquid crystal display, as display panels having a thin substrate, compact size, and high resolution, are generally desired by users, the display panel may be more vulnerable to the bruising due to external pressure.

The above information disclosed in this Background section is only for enhancement of understanding of the background of the invention and therefore it may contain information that does not form the prior art that is already known to a person of ordinary skill in the art.

SUMMARY OF THE INVENTION

Exemplary embodiments of the present invention provide a liquid crystal display having advantages of preventing a display defect, such as a bruising due to external pressure, in which the liquid crystal display includes a pixel electrode and a common electrode as two field generating electrodes formed on the same substrate. One of the pixel electrode and common electrode may have a plane shape and the other one of the pixel electrode and common electrode may include a plurality of branch electrodes.

Additional features of the invention will be set forth in the description which follows, and in part will be apparent from the description, or may be learned by practice of the invention.

Exemplary embodiments of the present invention provide a liquid crystal display including a first substrate, a second substrate facing the first substrate, a liquid crystal layer disposed between the first substrate and the second substrate, a first electrode on the first substrate, and a second electrode on the first substrate and including a plurality of branch electrodes overlapped with the first electrode. The second electrode includes a wing connected to an end of a first branch electrode disposed at one end of the plurality of branch electrodes.

Exemplary embodiments of the present invention also provide a liquid crystal display including a first substrate, a second substrate facing the first substrate, a liquid crystal layer disposed between the first substrate and the second substrate, a first electrode on the first substrate, and a second electrode on the first substrate and including a plurality of branch electrodes overlapped with the first electrode. The liquid crystal molecules in the liquid crystal layer are configured to be aligned in a first direction for at least a determined period of time. The second electrode further includes a connection part to connect ends of the plurality of branch electrodes. A length of a slit in the first direction is at least about 40 µm. The slit is formed between two of the plurality of branch electrodes. A value equivalent to multiplying a width of the connection part by the length of the slit is at least about 90.

Exemplary embodiments of the present invention also provide a liquid crystal display, including a first substrate, a second substrate facing the first substrate, a liquid crystal layer disposed between the first substrate and the second substrate, a first electrode on the first substrate, a second electrode on the first substrate and including a plurality of branch electrodes overlapped with the first electrode, a thin film transistor on the first substrate to transfer a data voltage to the second electrode, and an insulating layer disposed between the first electrode and the second electrode and including a contact hole to connect the second electrode and the thin film transistor. The second electrode is disposed on the first electrode. The first electrode includes a hole surrounding the contact hole. A slit between the plurality of branch electrodes is inclined towards to a first side of the plurality of branch electrodes with respect to a first direction and forms an oblique angle with the first direction. The liquid crystal molecules in the liquid crystal layer are configured to be aligned in the first direction for at least a determined period of time. A distance from a bottom of the slit to a first side of the hole closest to a bottom of the slit is at most 10 µm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 9 is a table illustrating whether or not a bruising occurs according to a condition of various parameters of the field generating electrode of the liquid crystal display according to exemplary embodiments of the present invention.

DETAILED DESCRIPTION OF THE ILLUSTRATED EMBODIMENTS

Figure 1:
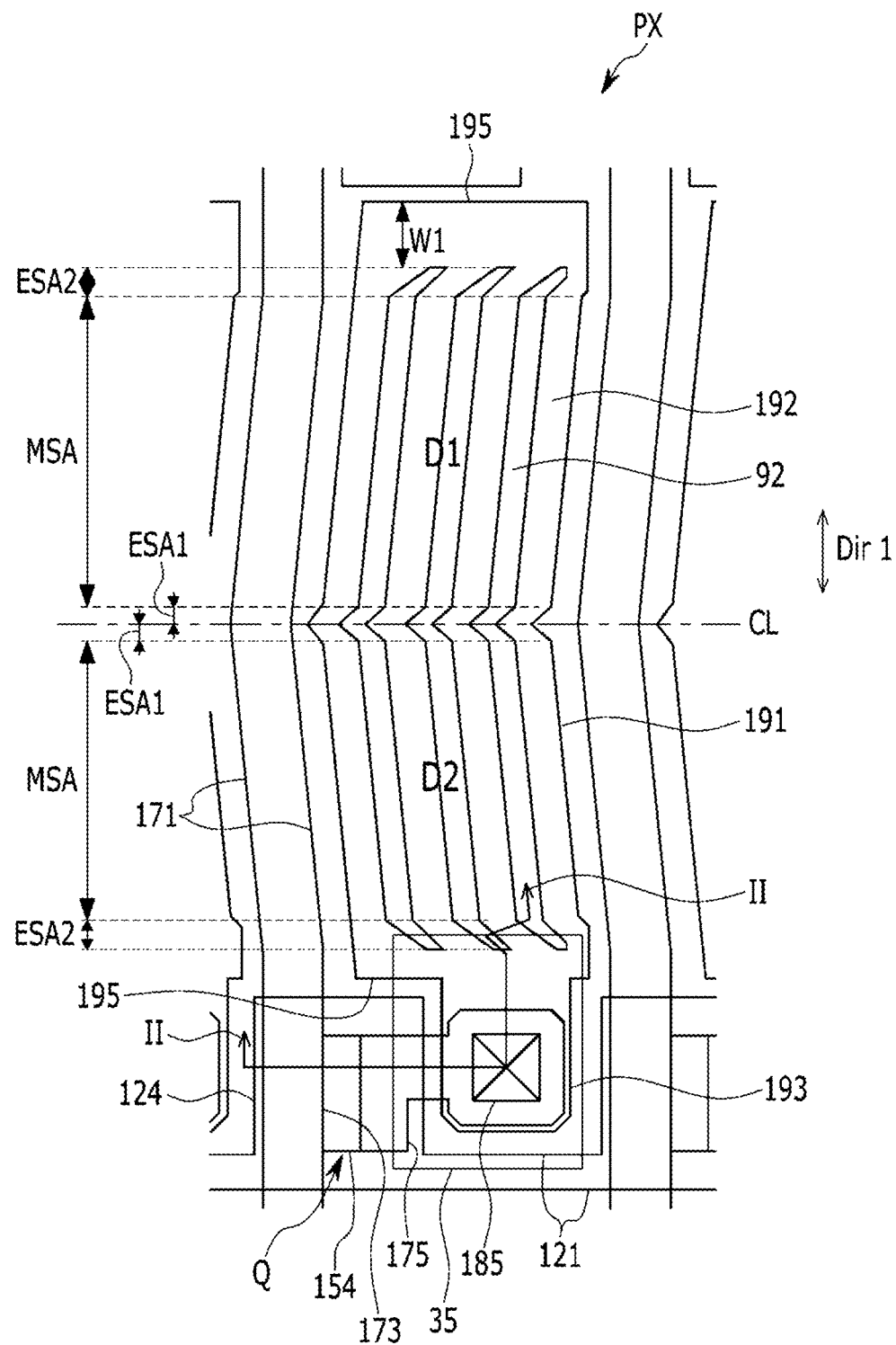
FIG. 1 is a layout view of a liquid crystal display according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention are described in detail with reference to the accompanying drawings.

A liquid crystal display will be described with reference to FIG. 1, FIG. 2, and FIG. 3.

FIG. 1 is a layout view of a liquid crystal display. FIG. 2 is a cross-sectional view taken along line II-II of the liquid crystal display of FIG. 1. FIG. 3 is an electron micrograph of one pixel for describing movements of liquid crystal molecules of the liquid crystal display.

Figure 2:
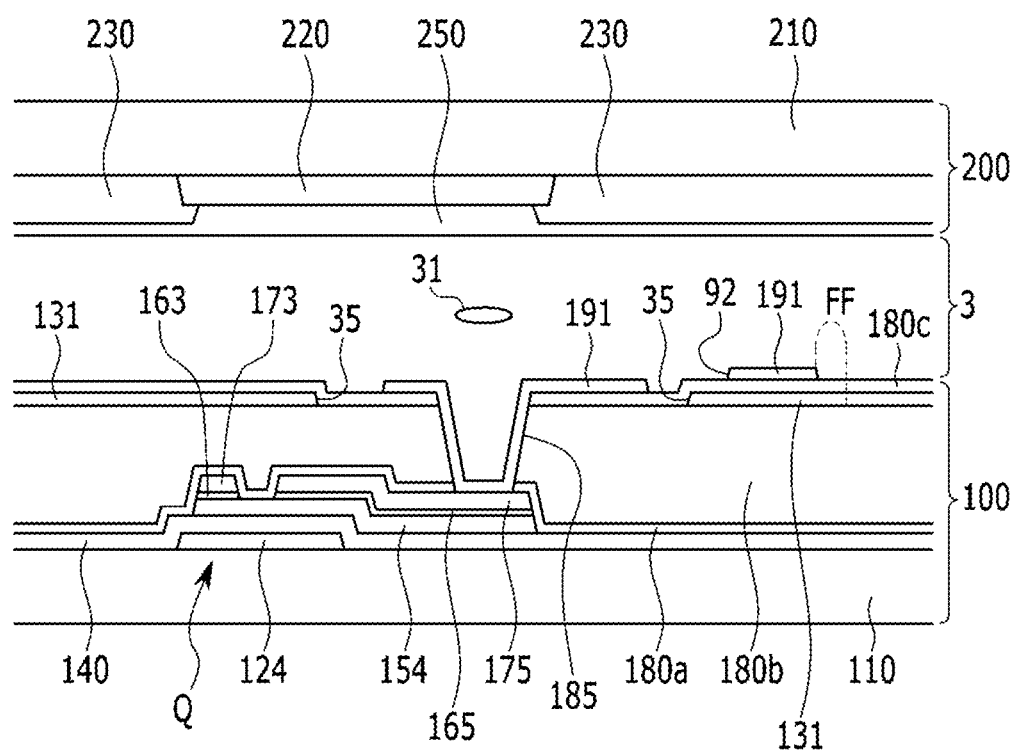
FIG. 2 is a cross-sectional view taken along line II-II of the liquid crystal display of FIG. 1.

Referring to FIG. 1 and FIG. 2, the liquid crystal display includes a lower panel 100 and an upper panel 200 facing each other. A liquid crystal layer 3 may be injected between the lower panel 100 and the upper panel 200.

The upper panel 200 will be described.

A light blocking member 220 and a color filter 230 may be formed on an insulation substrate 210 made of transparent glass or plastic. The light blocking member 220 may be referred to as a black matrix and may prevent light leakage between pixels PX. The color filter 230 may provide filtering according to one of the primary colors, such as red, green, and blue. In some cases, at least one of the light blocking member 220 and the color filter 230 may be positioned in the lower panel 100.

An overcoat 250 may be formed on the color filter 230 and the light blocking member 220.

The liquid crystal layer 3 may include liquid crystal molecules 31 having dielectric anisotropy. Long axes of the liquid crystal molecules 31 may be arranged to be parallel to the lower panel 100 and upper panel 200 while the electric field may not be applied to the liquid crystal layer 3, and the liquid crystal molecules 31 may have positive dielectric anisotropy. The liquid crystal molecules 31 may be nematic liquid crystal molecules having a structure in which long axial directions are spirally twisted up to the upper panel 200 from the lower panel 100.

The lower panel 100 will be described.

Gate conductors, including a plurality of gate lines 121, may be formed on the insulation substrate 110 made of transparent glass or plastic. The gate lines 121 may transfer gate signals, and may extend, in some cases, primarily in a horizontal direction. Each gate line 121 may include a plurality of gate electrodes 124.

A gate insulating layer 140 may be formed on the gate line 121. The gate insulating layer 140 may be made of an inorganic insulator such as silicon nitride (SiNx) or silicon oxide (SiOx).

A semiconductor 154 may be formed on the gate insulating layer 140. The semiconductor 154 may include amorphous silicon, polysilicon, or an oxide semiconductor.

Ohmic contacts 163 and 165 may be formed on the semiconductor 154. The ohmic contacts 163 and 165 may be made of a material such as n+ hydrogenated amorphous silicon in which n-type impurity, such as phosphorus, is doped at high concentration or silicide. The ohmic contacts 163 and 165 may make a pair and may be formed on the semiconductor 154. When the semiconductor 154 is an oxide semiconductor, the ohmic contacts 163 and 165 may be omitted.

Data conductors, including a data line 171 a source electrode 173, and a drain electrode 175, may be formed on the ohmic contact 163, ohmic contact 165, and the gate insulating layer 140.

The data line 171 may transfer a data signal and may extend, in some cases, primarily in a first direction Dir1 which may be a vertical direction. The data line 171 may be periodically curved in order to improve transmittance. For example, as illustrated in FIG. 1, each data line 171 may be bent at a portion corresponding to a horizontal center line CL of a pixel PX. An angle between the data line 171 and the first direction Dir1 may be about 5 to 7 degrees, but is not limited thereto. Further, the data line 171 may have at least once more bend near the horizontal center line CL, and an angle between the data line 171 near the horizontal center line CL and the first direction Dir1 may be about 7 to 15 degrees, but is not limited thereto.

Referring to FIG. 1, the source electrode 173 may not protrude from the data line 171 and may be positioned on the same line as the data line 171.

The drain electrode 175 may face the source electrode 173 and may include a rod-shaped portion extending substantially parallel to the source electrode 173, and an extension at opposite side to the source electrode 173.

The gate electrode 124, the source electrode 173, and the drain electrode 175 may form one thin film transistor (TFT) together with the semiconductor 154. A channel of the thin film transistor may be formed in the semiconductor 154 between the source electrode 173 and the drain electrode 175. Furthermore, it should be appreciated that the dimensions of the source electrode 173 and the drain electrode 175 may be different.

A first passivation layer 180a may be formed on the data conductors, the gate insulating layer 140, and the exposed portion of the semiconductor 154. The first passivation layer 180a may be made of an organic insulating material or an inorganic insulating material.

A second passivation layer 180b may be further formed on the first passivation layer 180a. The second passivation layer 180b may be made of an organic insulating material, and a surface of the second passivation layer 180b may be leveled. Thickness of the second passivation layer 180b may vary according to the location in the liquid crystal display.

In some cases, the second passivation layer 180b may include a color filter. The color filter may provide filtering according to one of a plurality of colors, including, for example red, green, and blue or yellow, cyan, and magenta.

A common electrode 131 may be formed on the second passivation layer 180b. The common electrode 131 may be formed in some cases, in a planar shape (e.g., in a plate-like shape) on a surface of the insulation substrate 110. The common electrodes 131 positioned in the plurality of pixels PX may be connected to each other to transfer the same common voltage Vcom. However, the common electrode 131 may include a hole 35 corresponding to the extension of the drain electrode 175.

The common electrode 131 may be made of a transparent conductive material such as indium tin oxide (ITO) or indium zinc oxide (IZO).

A third passivation layer 180c may be formed on the common electrode 131 and portions of the second passivation layer 180b. The third passivation layer 180c may be made of an organic insulating material or an inorganic insulating material. A contact hole 185, exposing the drain electrode 175, may be formed in the first passivation layer 180a, the second passivation layer 180b, and the third passivation layer 180c. The contact hole 185 may be positioned in the hole 35 of the common electrode 131. For instance, the hole 35 may surround the contact hole 185.

A pixel electrode 191 may be formed on the third passivation layer 180c and in the hole 35. The pixel electrode 191 may be connected to the drain electrode through the hole 35. The pixel electrode 191 may include a plurality of branch electrodes 192 overlapped with the common electrode 131, a connection part 195 connecting ends of the branch electrodes 192, and a protrusion 193 for connection with other layers. A slit 92, where the pixel electrode is removed or not formed, may be formed between adjacent branch electrodes 192 of the pixel electrode 191.

The branch electrodes 192 of the pixel electrode 191 may extend substantially parallel to the data line 171.

Referring to FIG. 1, exemplary embodiments of a shape of the pixel electrode 191 will be described.

The plurality of branch electrodes 192 of the pixel electrode 191 may form an oblique angle with the first direction Dir1 and may be bent at the horizontal center line CL. Accordingly, the pixel electrode 191 may be divided into a first domain D1 and a second domain D2 which may have different inclined directions of the branch electrodes 192 based on the horizontal center line CL of the pixel PX. For example, upper branch electrodes 192 may extend in an upper right direction based on the horizontal center line CL, and lower branch electrodes 192 may extend in a lower right direction. The branch electrodes 192 may be symmetrical to each other based on the horizontal center line CL. An acute angle between the branch electrode 192 and the first direction Dir1 may be about 5 to 7 degrees, but is not limited thereto.

The branch electrodes 192 and the slits 92 may be at least once more bent in each of the domains D1 and D2 and may be divided into a plurality of regions in each of the domains D1 and D2 based the respective on bending points. FIG. 1 illustrates that the branch electrodes 192 and the slits 92 are bent at least twice in each of the domains D1 and D2.

Referring to FIG. 1, the branch electrodes 192 and the slits 92, in each of the domains D1 and D2 may be divided into a first edge area ESA1 adjacent to the horizontal center line CL, a second edge area ESA2 positioned at an end removed from the horizontal center line CL, and a main area MSA positioned between the first and second edge areas ESA1 and ESA2. A length in the first direction Dir1 of the main area MSA may be larger than a length in the first direction Dir1 of each of the first and second edge areas ESA1 and ESA2. The branch electrodes 192 and the slits 92 may be bent on a boundary line between the first edge area ESA1 and the main area MSA, and the slits 92 may be bent on a boundary line between the second edge area ESA2 and the main area MSA. Acute angles between the branch electrodes 192 or the slits 92 of the first and second edge areas ESA1 and ESA2 and the first direction Dir1 may be the same as each other, and may be larger than acute angles between the branch electrodes 192 and the slits 92 of the main area MSA and the first direction Dir1. For example, acute angles between the slits 92 of the second edge area ESA2, or the branch electrodes 192 and the slits 92 of the first edge area ESA1 and the first direction Dir1, may be about 7 to 15 degrees. Acute angles between the branch electrodes 192 and the slits 92 of the main area MSA and the first direction Dir1 may be less than or equal to about 7 degrees.

A width of the branch electrode 192 of the pixel electrode 191 may be, for example, about 2.5 μm to about 3.5 μm, and a width of the slit 92 may be about 4.5 μm to about 5.5 μm, but are not limited thereto.

The connection part 195 of the pixel electrode 191 may connect ends of the branch electrodes 192, in some cases, at the side where the thin film transistor Q is formed, and/or, in some cases, at a side of the pixel PX opposite to where the thin film transistor Q is formed. A width W1 of the first direction Dir1 of the connection part 195 may be larger than a width of the branch electrode 192, and may be at least about 5 μm.

The protrusion 193 of the pixel electrode 191 may be physically and electrically connected with the drain electrode 175 through the contact hole 185 of the first passivation layer 180a, the second passivation layer 180b, and the third passivation layer 180c to receive a voltage from the drain electrode 175.

The pixel electrode 191 may be made of a transparent conductive material such as ITO or IZO.

The liquid crystal display may have a resolution of at least about 200 pixels per inch (PPI). For example, at least 200 pixels PX may be included in 1 square inch areas of the upper panels 100 and lower panels 200. Furthermore, a horizontal pitch of one pixel PX of the liquid crystal display may be about 40 μm or less, and a vertical pitch may be about 120 μm or less, but may not be limited thereto.

An alignment layer (not illustrated) may be coated on at least one inner surface of the lower display panel 100 and upper display panel 200, and may be a horizontal alignment layer. The alignment layer may be rubbed or photo-aligned in a predetermined direction, for example, the first direction Dir1. Accordingly, the liquid crystal molecules 31 of the liquid crystal layer 3 may initially be aligned in a substantially parallel direction to the first direction Dir1.

At least one touch sensor (not illustrated) capable of detecting a touch may be provided on at least one of the lower display panel 100 and the upper display panel 200. The touch sensor may be of various types such as a resistive type, a capacitive type, an electro-magnetic type (EM), and an optical type. The touch sensor may be formed on any one of the lower display panel 100 and upper display panel 200 or may be attached to the lower display panel 100 and upper display panel 200 as a touch panel.

Both the pixel electrode 191 receiving the data voltage through the thin film transistor Q and the common electrode 131 receiving the common voltage Vcom as two field generating electrodes may generate electric fields in the liquid crystal layer 3 to set alignment directions of the liquid crystal molecules 31 in the liquid crystal layer 3 and to display images. The branch electrode 192 of the pixel electrode 191 may also generate a fringe field FF in the liquid crystal layer 3 together with the common electrode 131 to determine the alignment directions of the liquid crystal molecules 31. Since the pixel electrode 191 may have different inclined directions of the branch electrodes 192 in a plurality of domains D1 and D2 in pixel PX, the inclined directions of the liquid crystal molecules 31 may be varied, thereby increasing a reference viewing angle of the liquid crystal display.

If the branch electrodes 192 or the slits 92 of the pixel electrode 191 may further be bent on the boundary between the main area MSA and the first edge area ESA1 or the second edge area ESA2, a texture which may occur when the liquid crystal molecules 31 are not controlled but reversely twisted, and collided, near the horizontal center line CL or near the edge of the pixel PX, may be reduced.

The liquid crystal molecules 31 may be controlled in a different direction from the main area MSA near the end of the slit 92 of the pixel electrode 191 and the horizontal center line CL. As a result, the liquid crystal molecules 31 may be recognized as the texture by decreasing the transmittance. A portion of the liquid crystal display corresponding to a region with such decreased transmission is called a texture portion. When pressure is applied to the lower display panel 100 and the upper display panel 200 displaying the images from the outside (e.g., a user of the liquid crystal display panel depresses an area corresponding to a touch screen), the alignment directions of the liquid crystal molecules 31 may be in disorder. Even after the external pressure is removed, the directions of the liquid crystal molecules 31 may not be restored. The lack of restoration of the orientation of the liquid crystal molecules 31 may be recognized as bruising. As illustrated in FIG. 3, the texture portion becomes a seed, and the misalignment of the liquid crystal molecules 31 of the adjacent texture portion may be transferred to the inside of the pixel PX or separated texture portions may be connected with each other. As a result, bruising may occur. The texture portion may be referred to as a bruising source, and may primarily be positioned near a corner of the pixel electrode 191. Hereinafter, bruising may also refer to a bruising remaining after the external pressure has been removed.

Figure 3:
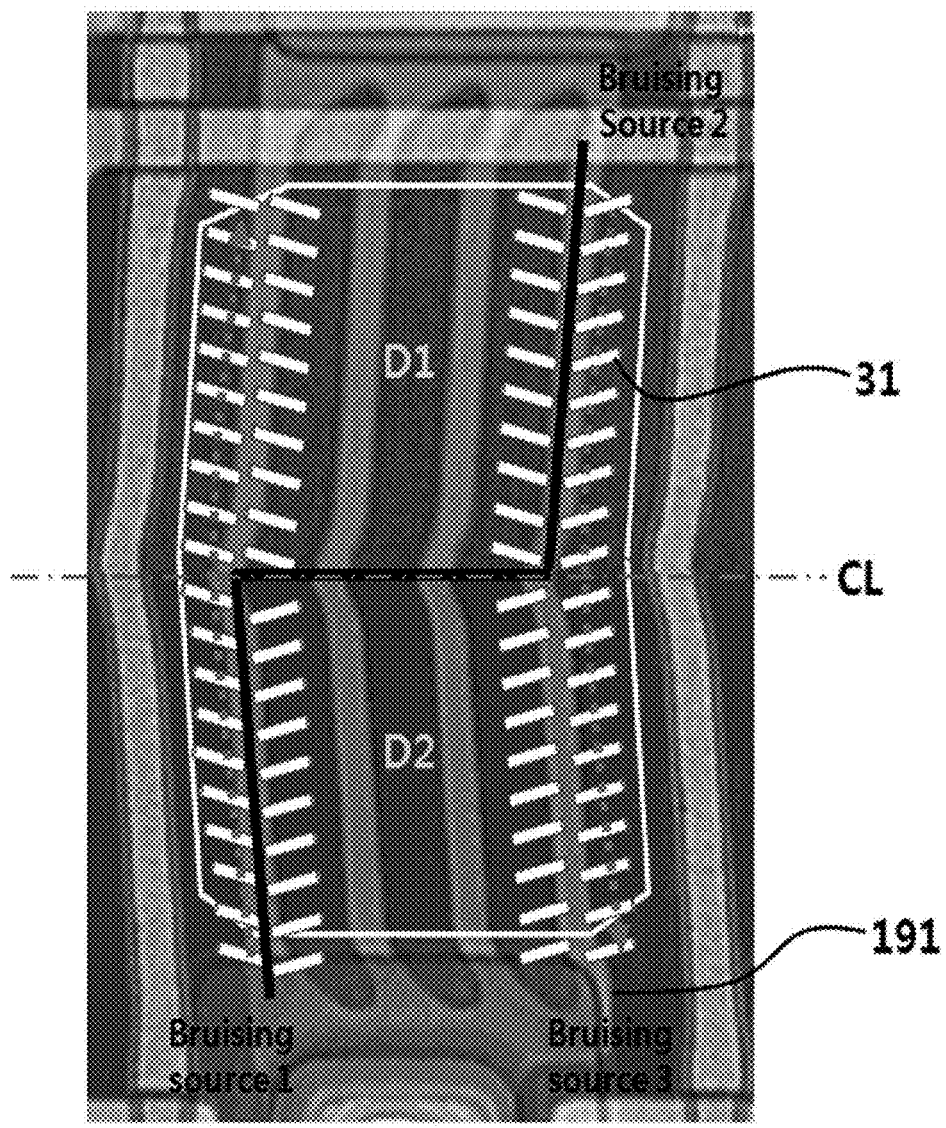
FIG. 3 is an electron micrograph of one pixel for describing movements of liquid crystal molecules of the liquid crystal display according to exemplary embodiments of the present invention.

FIG. 3 illustrates bruising sources (bruising source 1, bruising source 2, and bruising source 3) positioned at the corner of the pixel PX. In FIG. 3, an upper right bruising source (i.e., bruising source 2) and a lower left bruising source (i.e., bruising source 1) may become a seed, and the bruising may be generated along a black stripe. The liquid crystal molecules 31 generating the bruising may be referred to as left liquid crystal molecules 31 of the second domain D2 and right liquid crystal molecules 31 of the first domain D1 in FIG. 3.

When a width W1 of the connection part 195 in the first direction Dir1 connecting the ends of the branch electrodes 192 of the pixel electrode 191 is larger (e.g., at least about 5 μm) than a width of the branch electrodes 192, the bruising source may be removed. Accordingly, it is possible to prevent the bruising generated when misalignment of the liquid crystal molecules 31 at the texture portion at the edge of the pixel electrode 191 is transferred to the inside of the pixel PX, or the texture portion at the edge of the pixel electrode 191 and the texture portion near the horizontal center line CL are connected with each other.

A liquid crystal display according to the exemplary embodiment of the present invention will be described with reference to FIG. 4 and FIG. 5 together with the drawings described above. Like constituent elements as the exemplary embodiment described above designate like reference numerals, and the same description is omitted and differences will be described.

Figure 4:
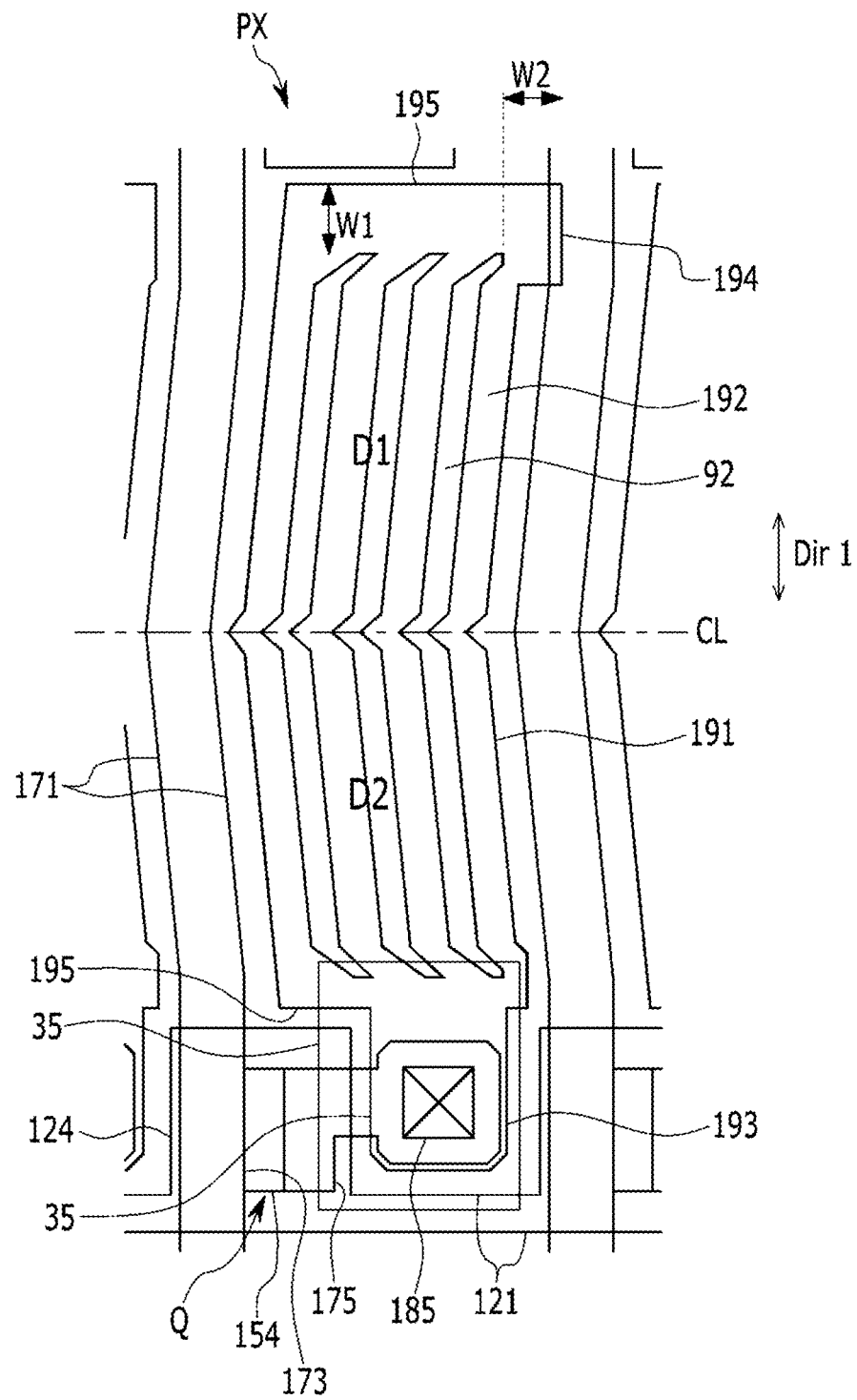
FIG. 4 is a layout view of a liquid crystal display according to exemplary embodiments of the present invention.
Figure 5:
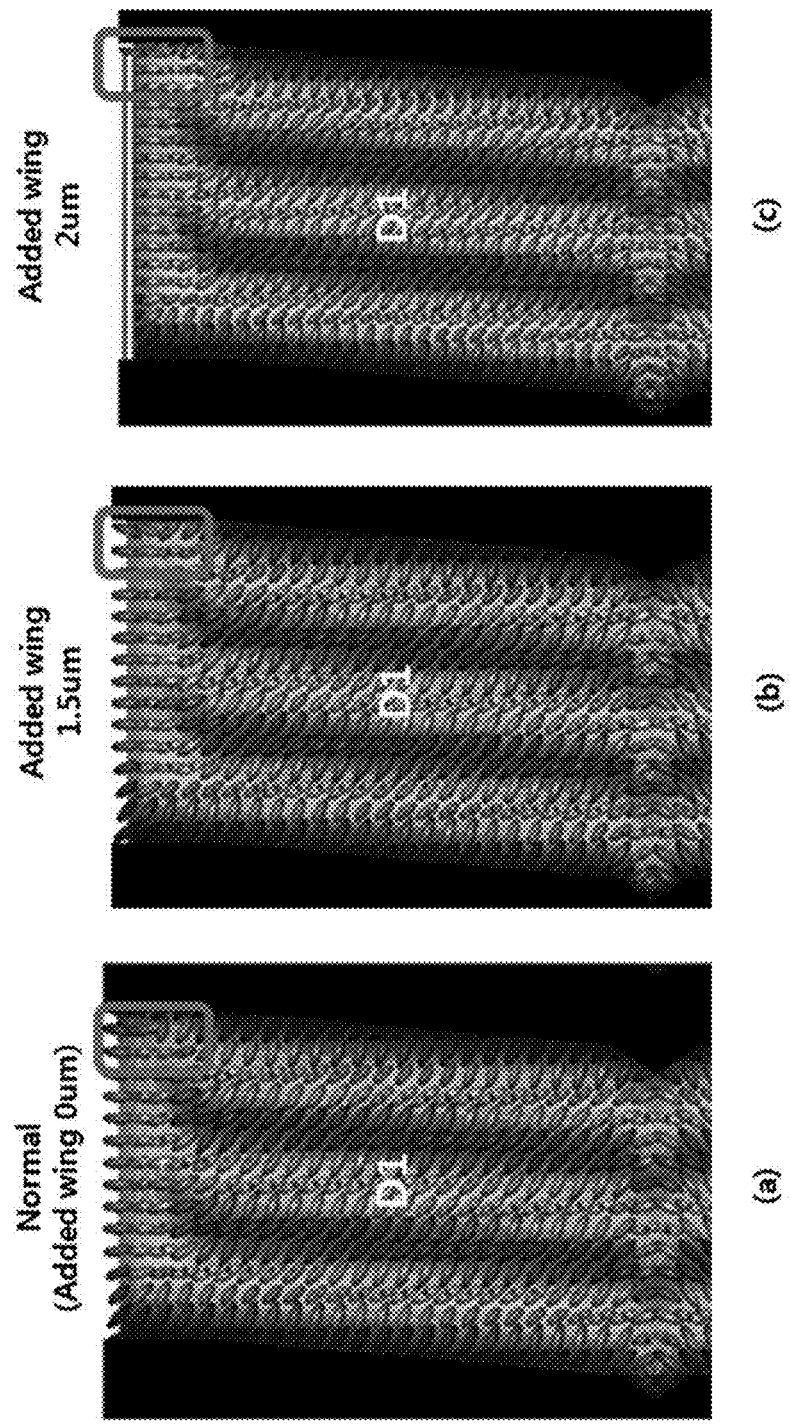
FIG. 5 is an electron micrograph illustrating movements of liquid crystal molecules according to a size of an added wing of the liquid crystal display according to exemplary embodiments of the present invention.

FIG. 4 is a layout view of a liquid crystal display, and FIG. 5 is an electron micrograph illustrating movements of liquid crystal molecules according to a size of an added wing of the liquid crystal display.

The liquid crystal display in FIG. 4 and FIG. 5 is similar to the exemplary embodiments illustrated in FIG. 1 and FIG. 2 described above, except the pixel electrode 191 may further include a connection part 195 connecting the branch electrode 192 at the opposite side of the thin film transistor Q and an added wing 194 connected to the end of the rightmost branch electrode 192 and protruding from the connection part 195.

The added wing 194 may be positioned at a corner of a side of the pixel electrode 191 where the slit 92 is inclined, for example, the side at which the end of the slit 92 faces two upper corners of the pixel electrode 191. For example, as illustrated in FIG. 4, if the slit 92 has a slope towards an upper right direction, the added wing 194 may be positioned at the upper right corner of the pixel electrode 191.

A horizontal length W2 of the added wing 194 may be larger than a value acquired by adding about 2 μm to the width W1 of the connection part 195. The horizontal length W2 of the added wing 194 may be a length from the rightmost slit 92, that is, a side of the slit 92 closest to the added wing 194 to a right side of the added wing 194 (e.g., side of the added wing 194 away from the rightmost slit 92), as illustrated in FIG. 4. The width W1 of the connection part 195, in some cases, may be larger than the width of the branch electrode 192, and, in some cases, may not be larger than the width of the branch electrode 192. In some cases, the width W1 of the connection part 195 may be substantially similar to the width of the branch electrode 192.

FIG. 5(a) illustrates the alignment of the liquid crystal molecules 31 in the case where the horizontal length W2 of the added wing 194 is larger than the width W1 of the connection part 195 by about 0 μm (i.e., the same width). FIG. 5(b) illustrates the alignment of the liquid crystal molecules 31 where the horizontal length W2 of the added wing 194 may be larger than the width W1 of the connection part 195 by about 1.5 μm. FIG. 5(c) illustrates the alignment of the liquid crystal molecules 31 where the horizontal length W2 of the added wing 194 may be larger than the width W1 of the connection part 195 by about 2 μm.

Referring to FIG. 5, as the horizontal length W2 of the added wing 194 is increased, the misalignment of the liquid crystal molecules 31 may occur away from the texture portion in the pixel PX or at another position at the corner where the slit 92 of the pixel electrode 191 faces. As a result, generation of the bruising may be reduced. In liquid crystal displays with high resolution of 200 PPI or more, when the horizontal length W2 of the added wing 194 is larger than a value acquired by adding about 2 μm to the width W1 of the connection part 195, bruising may be prevented.

A liquid crystal display according to the exemplary embodiment of the present invention will be described with reference to FIG. 6 and FIG. 7 together with the drawings described above. Like constituent elements as the exemplary embodiment described above designate like reference numerals, and the same description is omitted and differences will be described.

Figure 6:
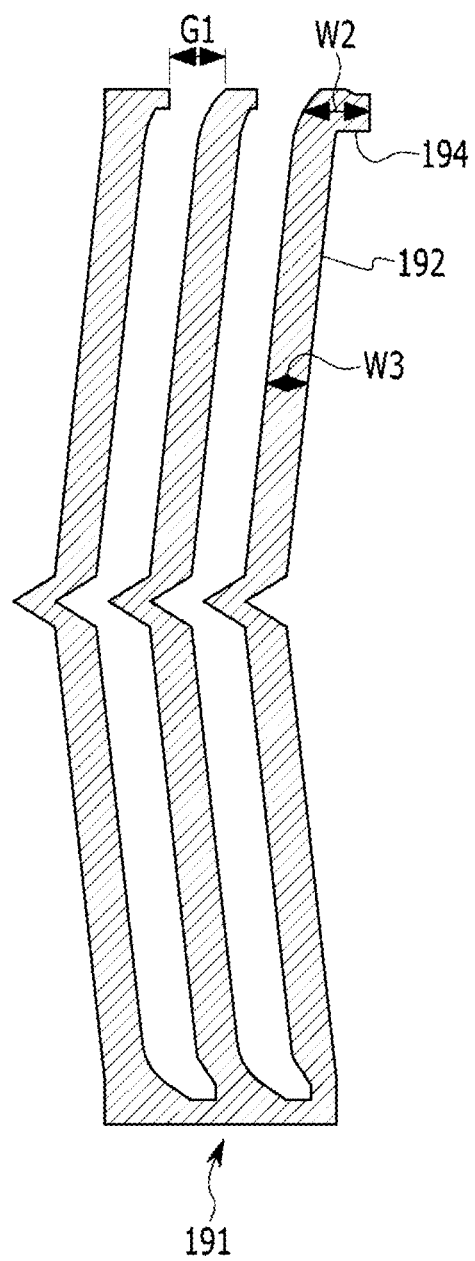
FIG. 6 is a plan view of a field generating electrode of the liquid crystal display according to exemplary embodiments of the present invention.

FIG. 6 is a plan view of a field generating electrode of the liquid crystal display. FIG. 7 is an electron micrograph illustrating movements of liquid crystal molecules according to a size of an added wing of the liquid crystal display.

Figure 7:
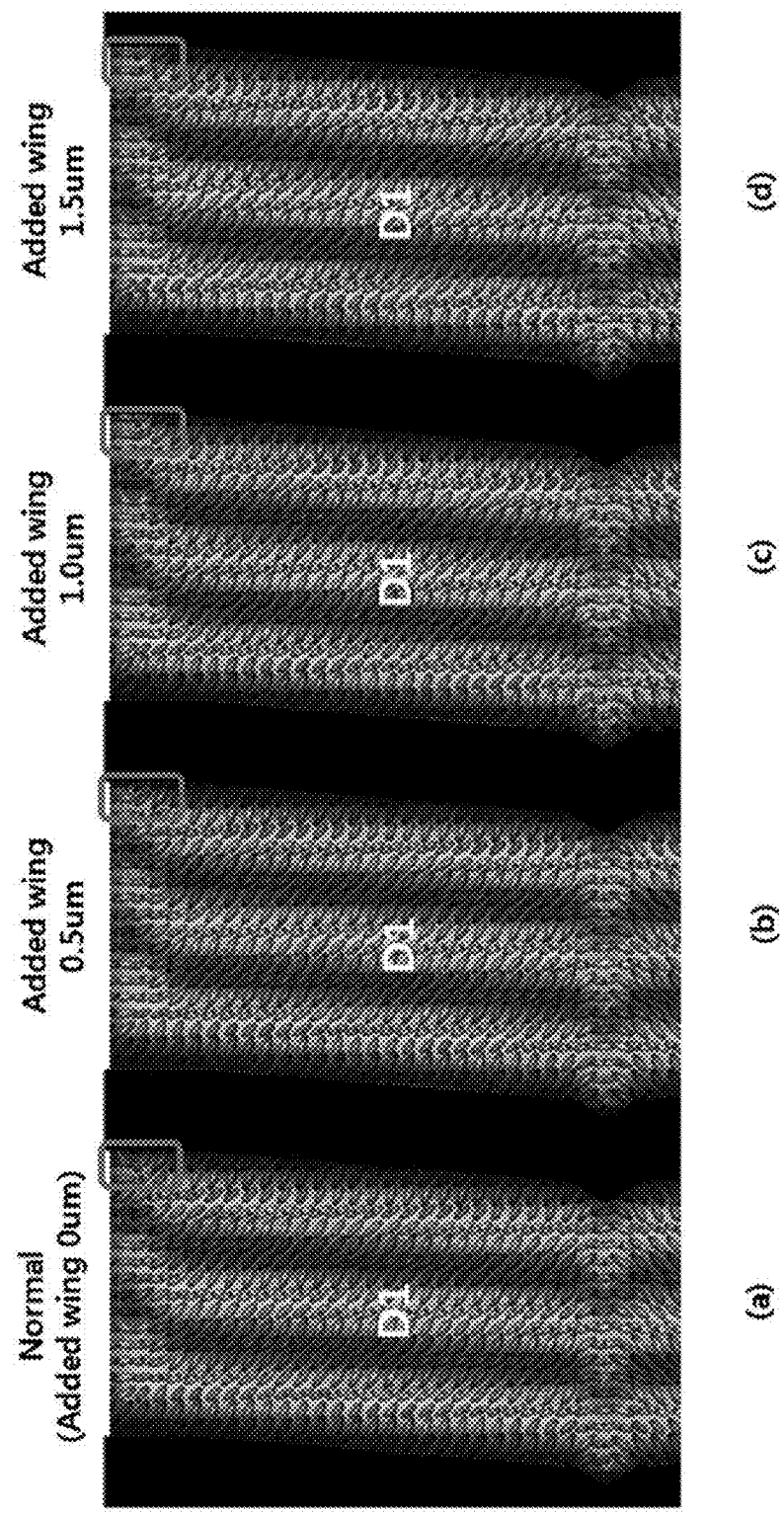
FIG. 7 is an electron micrograph illustrating movements of liquid crystal molecules according to a size of an added wing of the liquid crystal display according to exemplary embodiments of the present invention.

The liquid crystal display in FIG. 6 and FIG. 7 may be similar to the exemplary embodiments described above, except that in the pixel PX, an end of the branch electrode 192 at side opposite to the thin film transistor Q may not be connected, and the added wing 194 may be connected to the end of the rightmost branch electrode 192.

A gap G1 between the ends of the branch electrodes 192 may be larger than 0 μm and the gap G1 may not be particularly limited.

The horizontal length W2 of the added wing 194 may be equal to or larger than a value acquired by adding about 1.5 μm to the width W3 of the branch electrode 192.

FIG. 7(a) illustrates the alignment of the liquid crystal molecules 31 in a case that the horizontal length W2 of the added wing 194 is larger than the width W3 of the branch electrode 192 by about 0 μm. FIG. 7(b) illustrates the alignment of the liquid crystal molecules 31 where the horizontal length W2 of the added wing 194 may be larger than the width W3 of the branch electrode 192 by about 0.5 μm. FIG. 7(c) illustrates the alignment of the liquid crystal molecules 31 in the case that the horizontal length W2 of the added wing 194 may be larger than the width W3 of the branch electrode 192 by about 1.0 μm. FIG. 7(d) illustrates the alignment of the liquid crystal molecules 31 in the case that the horizontal length W2 of the added wing 194 may be larger than the width W3 of the branch electrode 192 by about 1.5 μm.

Referring to FIG. 7, even in the case where there is no portion connecting an upper end of the branch electrode 192 of the pixel electrode 191, as the horizontal length W2 of the added wing 194 is increased, misalignment of the liquid crystal molecules 31 may occur away from the texture portion in the pixel PX or at another position at the corner where the slit 92 of the pixel electrode 191 faces. As a result, bruising may be reduced. In liquid crystal displays with high resolution of 200 PPI or more, if the horizontal length W2 of the added wing 194 is larger than a value acquired by adding about 1.5 μm to the width W3 of the branch electrode 192, bruising may be prevented from being generated.

The liquid crystal display will be described with reference to FIG. 8 and FIG. 9 together with the drawings described above. Like constituent elements as the exemplary embodiment described above designate like reference numerals, and the same description is omitted and differences will be described.

Figure 8:
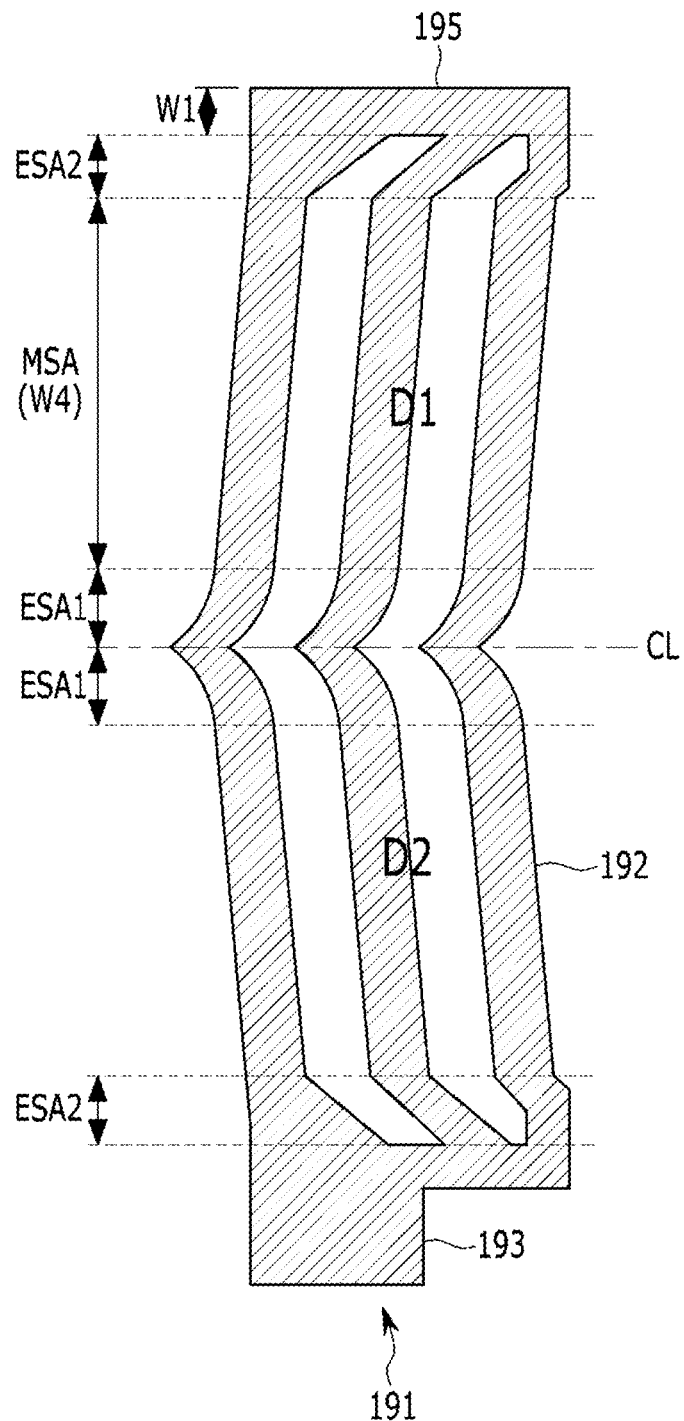
FIG. 8 is a plan view of a field generating electrode of the liquid crystal display according to exemplary embodiments of the present invention.

FIG. 8 is a plan view of a field generating electrode of the liquid crystal display. FIG. 9 is a table illustrating whether or not bruising occurs according to a condition of various parameters of the field generating electrode of the liquid crystal display.

The liquid crystal display in FIG. 8 and FIG. 9 is similar to the exemplary embodiment illustrated in FIG. 1 and FIG. 2 described above, except a length of the main area MSA may be limited in order to prevent bruising from being generated. The width W1 of the connection part 195, in some cases, may be larger than the width of the branch electrode 192, and, in some cases, may not be larger than the width of the branch electrode 192. In some cases, the width W1 of the connection part 195 may be substantially similar to the width of the branch electrode 192.

A length W4 in the first direction Dir1 of the main area MSA may be larger than about 40 μm, and simultaneously, a value acquired by multiplying the width W1 of the upper connection part 195 by the length W4 in the first direction Dir1 of the main area MSA may be larger than about 90.

FIG. 9 illustrates bruising generation according to various parameters and various resolution values of the pixel electrode 191. The length W4 in the first direction Dir1 of the main area MSA and the width W1 of the connection part 195 may be used as the parameters of the pixel electrode 191. Referring to FIG. 9, when the length W4 in the first direction Dir1 of the main area MSA is larger than about 40 μm and the value acquired by multiplying the width W1 of the upper connection part 195 by the length W4 in the first direction Dir1 of the main area MSA is larger than about 90, bruising may not occur.

A liquid crystal display according to the exemplary embodiment of the present invention will be described with reference to FIG. 10 and FIG. 11 together with the drawings described above. Like constituent elements as the exemplary embodiment described above designate like reference numerals, and the same description is omitted and differences will be described.

Figure 10:
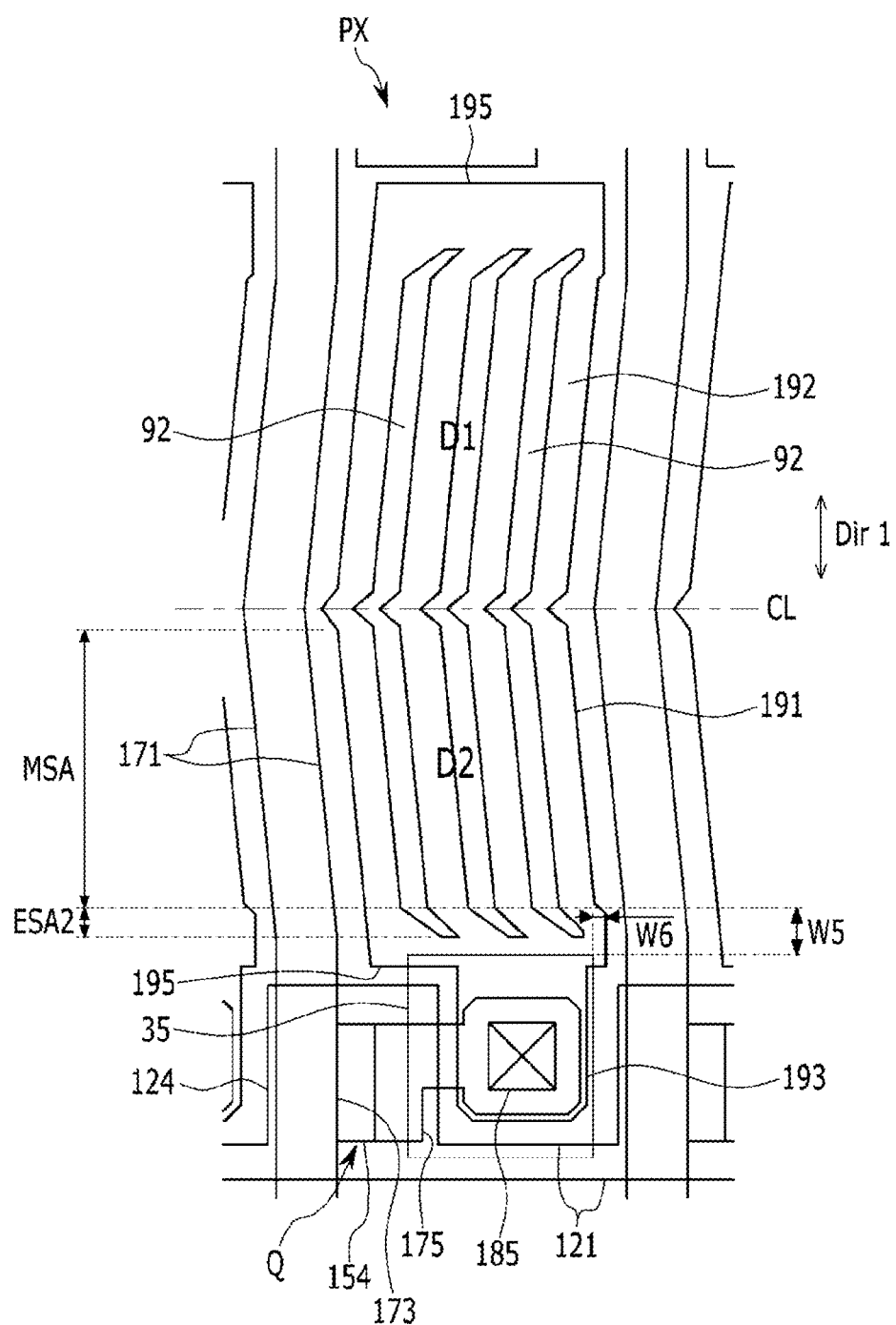
FIG. 10 is a layout view of a liquid crystal display according to exemplary embodiments of the present invention.

FIG. 10 is a layout view of a liquid crystal display. FIG. 11 is an electron micrograph illustrating movements of liquid crystal molecules according to a position of a common electrode hole of the liquid crystal display.

Figure 11:
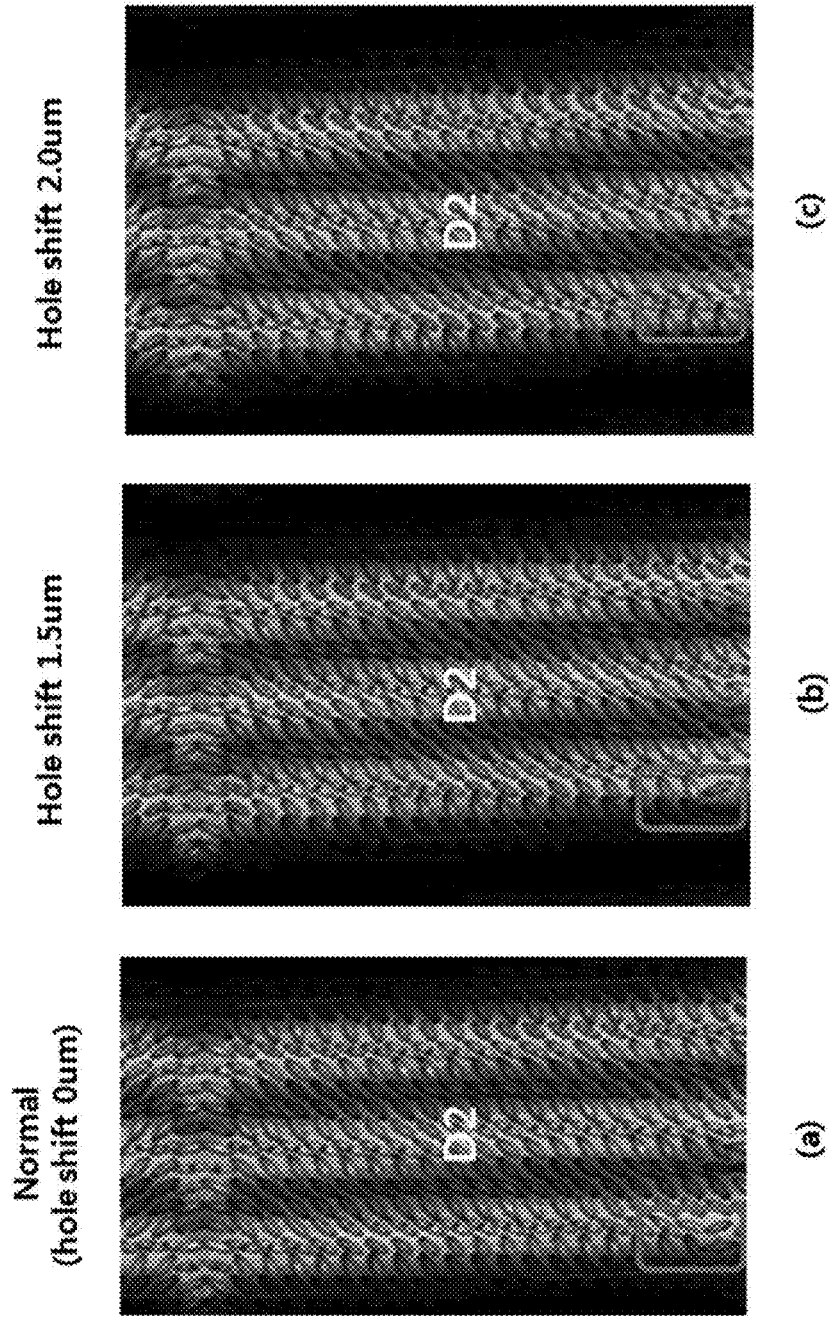
FIG. 11 is an electron micrograph illustrating movements of liquid crystal molecules according to a position of a common electrode hole of the liquid crystal display according to exemplary embodiments of the present invention.

The liquid crystal display in FIG. 10 and FIG. 11 is similar to the exemplary embodiments described above, except a size or a position of the hole 35 of the common electrode 131 may be limited to minimize bruising from being generated.

When an electric field is generated in the liquid crystal layer 3, the hole 35 of the common electrode 131 and the pixel electrode 191 may generate a fringe field in the liquid crystal layer 3 to control alignment directions of the liquid crystal molecules 31. As illustrated in FIG. 10, if a distance W5 from a curved point between the second edge area ESA2 and the main area MSA of the slit 92 of the pixel electrode 191 to a side of the hole 35 of the common electrode 131 closest to the curved point (e.g., an upper side of the hole 35 is about 10 μm or less), bruising, generated by the texture portion of a lower left corner of the pixel electrode 191 as a seed, may be reduced. The upper side of the hole 35 of the common electrode 131 may be positioned above the curved point between the second edge area ESA2 and the main area MSA of the slit 92 of the pixel electrode 191.

As illustrated in FIG. 10, for example, in which the slit 92 of the pixel electrode 191 is inclined to the right based on the first direction Dir1, if a distance W6 from a right side of the pixel electrode 191 to a side of the hole 35 of the common electrode 131 closest to the right side (e.g., an upper side of the hole 35 is about 10 μm or less), bruising may be prevented from being generated by the texture portion of a lower right corner of the pixel electrode 191. The right side of the hole 35 of the common electrode 131 may be positioned at the right of the right side of the pixel electrode 191 in the pixel PX.

FIG. 11(a) illustrates the alignment of the liquid crystal molecules 31 in which a distance between a left side of the hole 35 of the common electrode 131 and a left edge side of the pixel electrode 191 is about 0 μm. FIG. 11(b) illustrates the alignment of the liquid crystal molecules 31 in which the distance between the left side of the hole 35 of the common electrode 131 and the left edge side of the pixel electrode 191 is about 1.5 μm. FIG. 11(c) illustrates the alignment of the liquid crystal molecules 31 in which the distance between the left side of the hole 35 of the common electrode 131 and the left edge side of the pixel electrode 191 is about 2.0 μm.

In some cases, when the slit 92 is inclined in the right direction, when the left side of the hole 35 of the common electrode 131 is positioned at the right of the leftmost edge side of the pixel electrode 191 by about 2 μm or more, bruising generated by the texture portion of the lower left corner of the pixel electrode 191 as a seed may be reduced.

In some cases, when the slit 92 is inclined in the right direction, the right side of the hole 35 of the common electrode 131 is arranged with the right edge side of the pixel electrode 191 and positioned at the right, bruising generated by the texture portion of the lower right corner of the pixel electrode 191 as a seed may be reduced.

In the exemplary embodiments described above, when the slit 92 of the pixel electrode 191 is inclined in the right direction, the slit 92 may be inclined to the left. For example, a position of the added wing 194 of the pixel electrode 191 or the hole 35 of the common electrode 131 may be opposite to the position described above.

At least a feature of the exemplary embodiments of the invention described above may be simultaneously applied to a liquid crystal display.

A liquid crystal display according to the exemplary embodiment of the present invention will be described with reference to FIG. 12 and FIG. 13.

Figure 12:
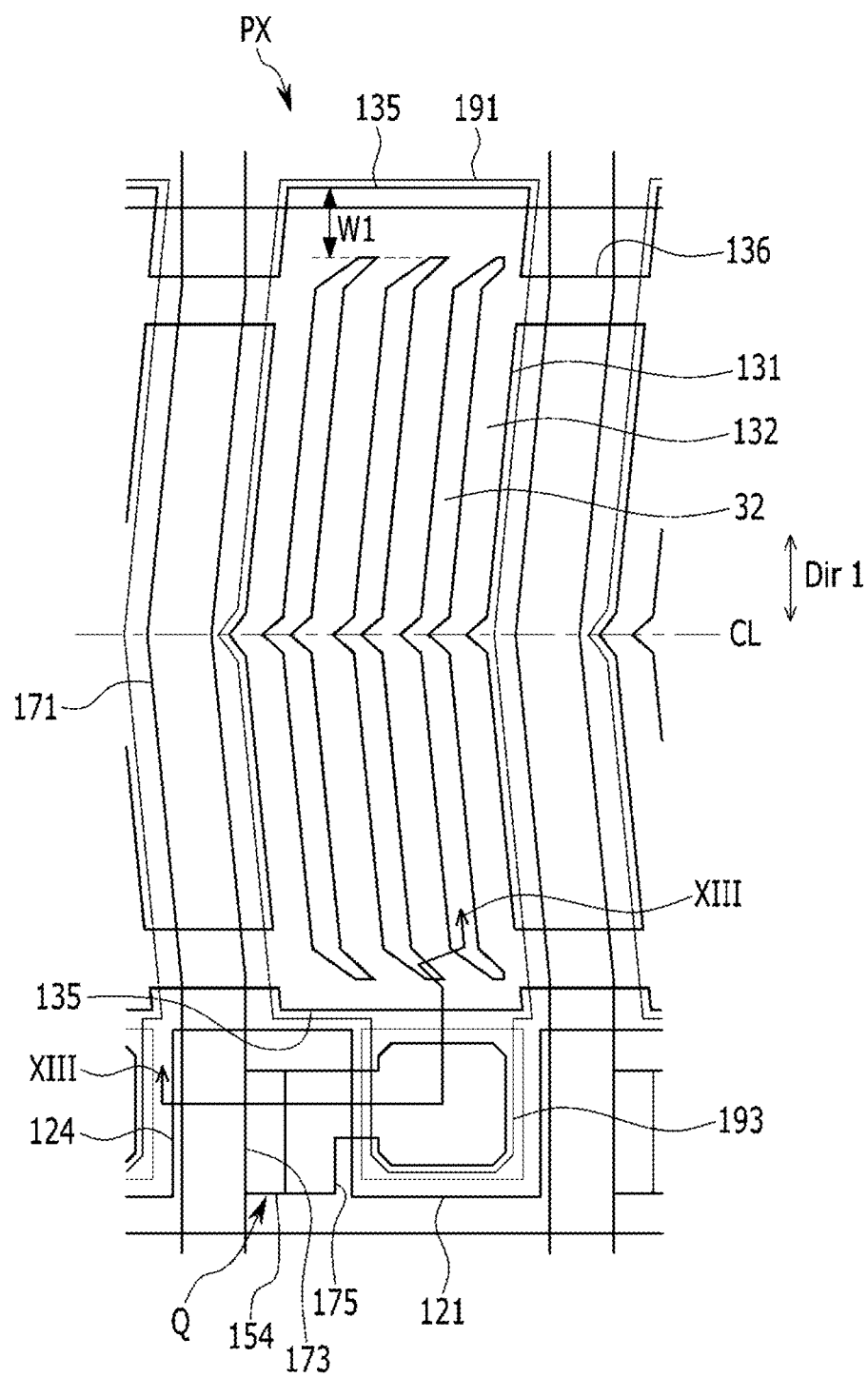
FIG. 12 is a layout view of a liquid crystal display according to exemplary embodiments of the present invention.

FIG. 12 is a layout view of a liquid crystal display according to exemplary embodiments of the invention. FIG. 13 is a cross-sectional view taken along line XIII-XIII of the liquid crystal display of FIG. 12.

Figure 13:
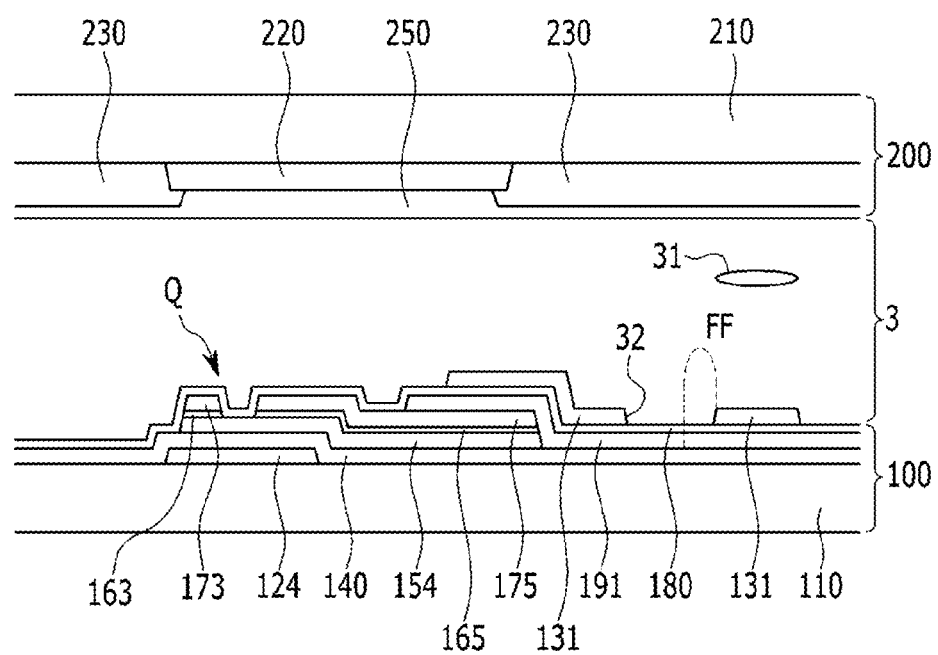
FIG. 13 is a cross-sectional view taken along line XIII-XIII of the liquid crystal display of FIG. 12.

The liquid crystal display in FIG. 12 and FIG. 13 may be similar to the exemplary embodiments described above, except a laminated position of the pixel electrode 191 and the common electrode 131 is different. Differences from the exemplary embodiment described above will be described.

In the lower panel 100, gate conductors, including a gate line 121 and a gate electrode 124, may be formed on an insulation substrate 110. A gate insulating layer 140 may be formed on the gate conductors, and a semiconductor 154 may be formed on the gate insulating layer 140. Ohmic contacts 163 and 165 may be formed on the semiconductor 154. Data conductors, including a source electrode 173 and a drain electrode 175, may be formed on the ohmic contacts 163 and 165 and the gate insulating layer 140.

A pixel electrode 191 may be formed directly on the drain electrode 175. The pixel electrode 191 may directly contact the drain electrode 175. The pixel electrode 191 may, in some cases, have a planar shape, for example, a plate-like form, and may be formed in one pixel PX.

An insulating layer (not illustrated) may be further positioned between the data conductors and the pixel electrode 191. The pixel electrode 191 may also be electrically connected with the drain electrode 175 through a contact hole (not illustrated) of the insulating layer.

A passivation layer 180 may be formed on the data conductors, the gate insulating layer 140, the exposed portion of the semiconductor 154, and the pixel electrode 191.

A common electrode 131 may be formed on the passivation layer 180. The common electrodes 131 positioned in a plurality of pixels PX may be connected with each other through a connection bridge 136 to transfer the same common voltage Vcom. The common electrode 131 may include a plurality of branch electrodes 132 overlapped with the pixel electrode 191 having a planar shape, and a connection part 135 connecting ends of the branch electrodes 132. A slit 32 where the common electrode 131 has been removed may be formed between the adjacent branch electrodes 132 of the common electrode 131.

Since the shape of the common electrode 131 may be substantially similar to the shape of the pixel electrode 191 of the exemplary embodiments illustrated in FIG. 1, FIG. 2, FIG. 3, FIG. 4, FIG. 5, FIG. 6, FIG. 7, FIG. 8, FIG. 9, FIG. 10, and FIG. 11 described above, a detailed description with respect to FIG. 12 and FIG. 13 is omitted. Particularly, a width W1 in the first direction Dir1 of the connection part 135 of the common electrode 131 connecting the ends of the branch electrodes 132 at a side of the pixel PX where the thin film transistor Q is located or the ends of the branch electrodes 132 at a side in the pixel PX opposite to where the thin film transistor Q is located may be larger than a width of the branch electrode 132 and, may be at least about 6 μm.

Both the pixel electrode 191 receiving the data voltage through the thin film transistor Q and the common electrode 131 receiving the common voltage Vcom may generate electric fields in the liquid crystal layer 3 to determine directions of the liquid crystal molecules 31 in the liquid crystal layer 3 and to facilitate the display of images. The branch electrode 132 of the common electrode 131 may generate a fringe field FF in the liquid crystal layer 3, together with the pixel electrode 191, to determine, at least in part, the alignment directions of the liquid crystal molecules 31. Since one pixel electrode 191 may include a plurality of domains D1 and D2 having different inclined directions of the branch electrodes 132 of the common electrode 131, the inclined directions of the liquid crystal molecules 31 may be varied, thereby increasing a reference viewing angle of the liquid crystal display.

As illustrated in FIG. 12, the width W1 in the first direction Dir1 of the connection part 135 connecting the ends of the branch electrodes 132 of the common electrode 131 may be larger than the width of the branch electrode 132, for example, at least about 5 μm. As a result, bruising may be prevented.

A liquid crystal display according to exemplary embodiments of the invention will be described with reference to FIG. 14.

Figure 14:
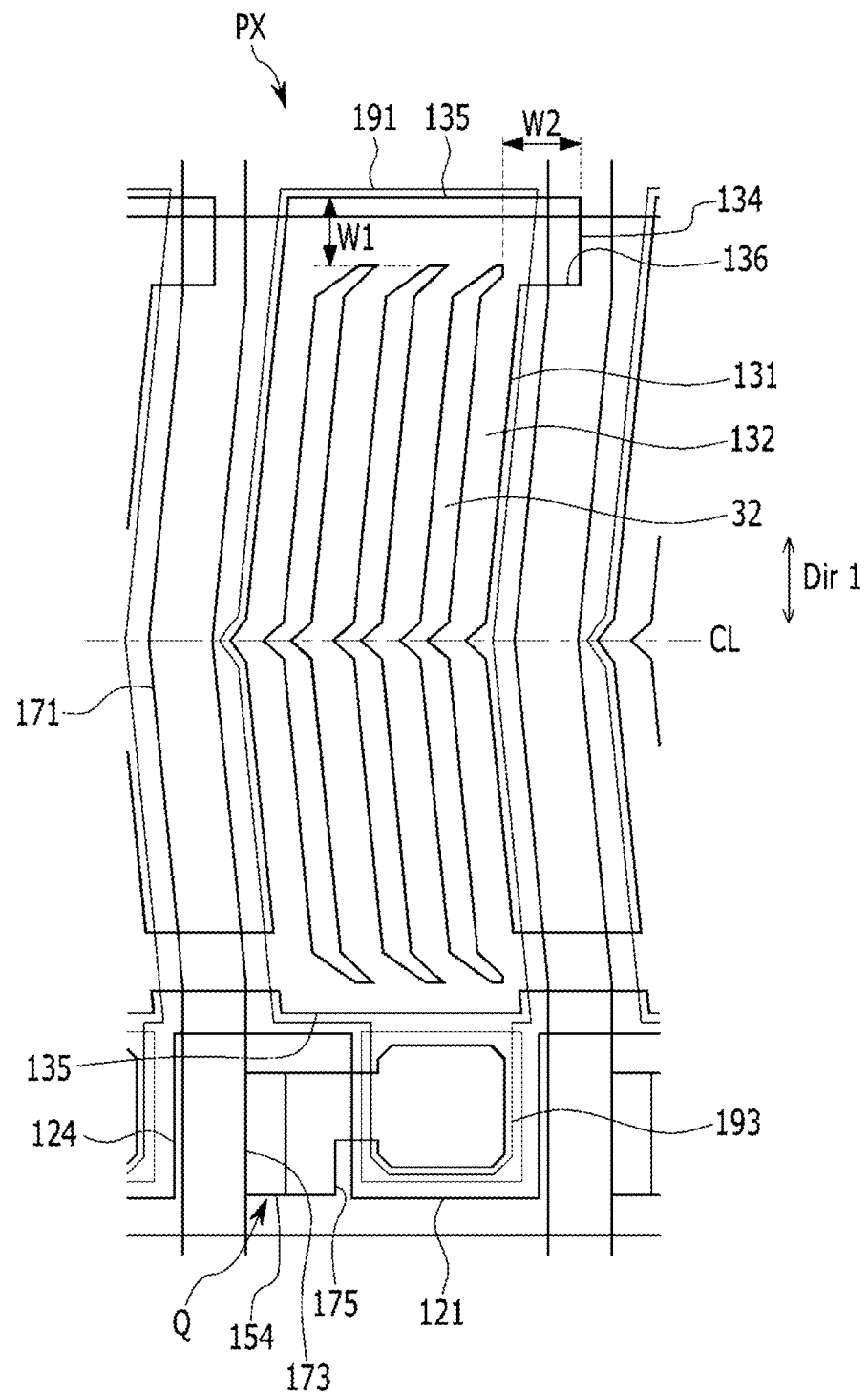
FIG. 14 is a layout view of a liquid crystal display according to exemplary embodiments of the present invention.

FIG. 14 is a layout view of a liquid crystal display.

The liquid crystal display in FIG. 14 may be similar to the exemplary embodiments illustrated in FIG. 12 and FIG. 13 described above. As with the exemplary embodiments illustrated in FIG. 4 and FIG. 5, the common electrode 131 may further include a connection part 135, connecting a branch electrode 132 at a side of the pixel PX opposite to the thin film transistor Q, and/or an added wing 134 connected with an end of the rightmost branch electrode 132. Since many features such as a position, a size, and an effect of the added wing 134 of the common electrode 131 are the same as the features of the added wing 194 of the pixel electrode 191 of the exemplary embodiments illustrated in FIG. 4 and FIG. 5 described above, a detailed description of the connection part 135, added wing 134, and rightmost branch electrode 132 is omitted.

A liquid crystal display according to exemplary embodiments of the invention will be described with reference to FIG. 15 together with the drawings described above.

Figure 15:
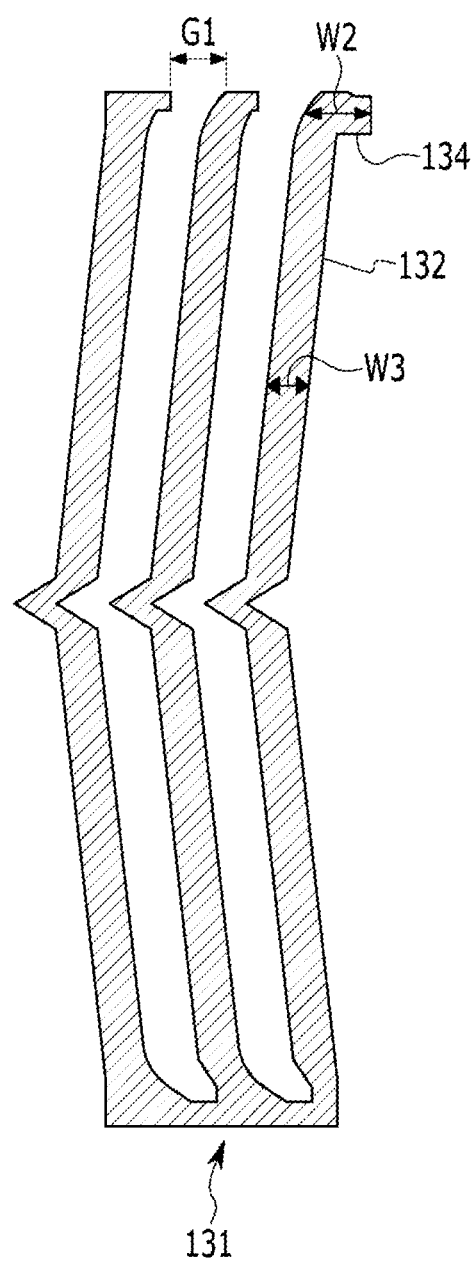
FIG. 15 and FIG. 16 are plan views of a field generating electrode of the liquid crystal display according to exemplary embodiments of the present invention, respectively.

FIG. 15 is a plan view of a field generating electrode of the liquid crystal display.

The liquid crystal display in FIG. 15 may be similar to the exemplary embodiments illustrated in FIG. 12 and FIG. 13 described above. As with the exemplary embodiments illustrated in FIG. 6 and FIG. 7, in the common electrode 131, ends of the branch electrode 132 at a side of the pixel PX opposite to the thin film transistor Q may not be connected, and the added wing 134 may be connected to an end of the rightmost branch electrode 132. Since many features of the common electrode 131 such as a position, a size, and an effect of the added wing 134 of the common electrode 131 may be the same as the features of the pixel electrode 191 of the exemplary embodiments illustrated in FIG. 6 and FIG. 7 described above, a detailed description of the common electrode 131 is omitted.

A liquid crystal display according to exemplary embodiments of the invention will be described with reference to FIG. 16 together with the drawings described above.

Figure 16:
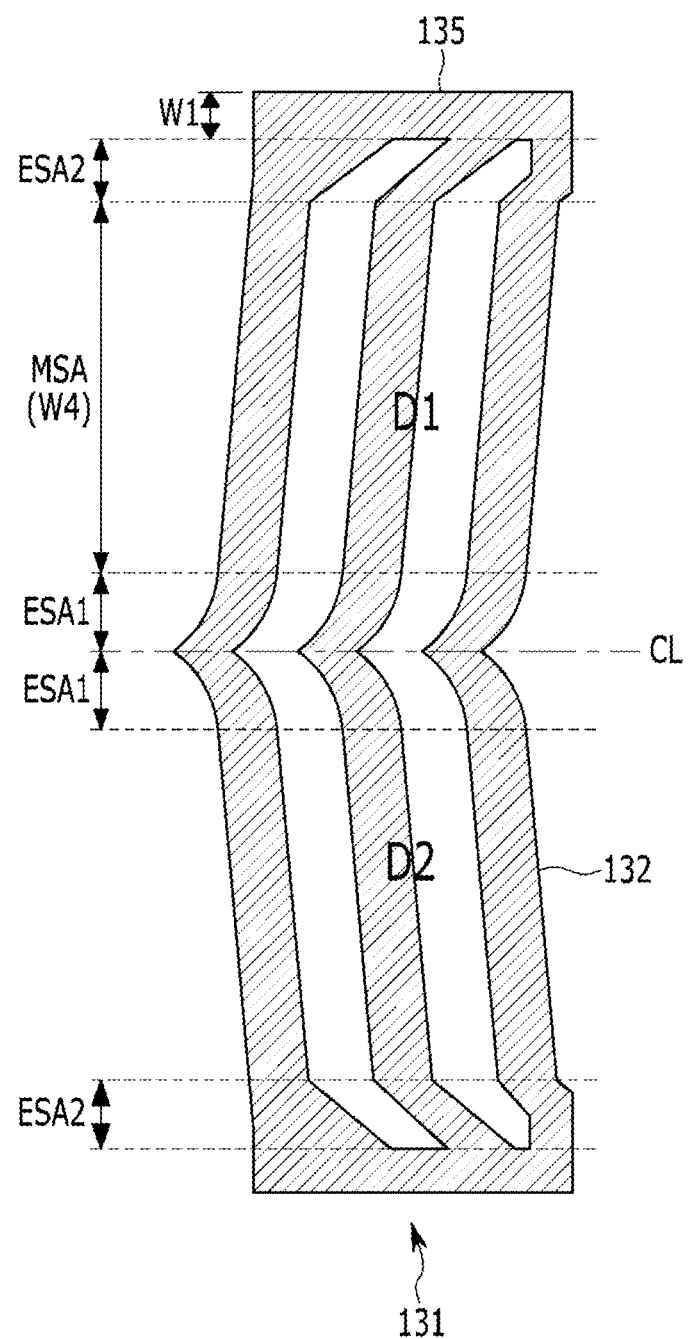

FIG. 16 is a plan view of a field generating electrode of the liquid crystal display.

The liquid crystal display in FIG. 16 may be similar to the exemplary embodiments illustrated in FIG. 12 and FIG. 13 described above. As with the exemplary embodiments illustrated in FIG. 8, a length of the main area MSA of the common electrode 131 may be limited to prevent bruising from being generated. In some cases, the width W1 of the connection part 135 may be larger than the width of the branch electrode 132, and, in some cases, the width W1 of the connection part 135 may not be larger than the width of the branch electrode 132. In some cases, the width W1 of the connection part 135 may be substantially similar to the width of the branch electrode 132. A length W4 in the first direction Dir1 of the main area MSA may be at least about 40 μm, and a value acquired by multiplying the width W1 of the upper connection part 135 by the length W4 in the first direction Dir1 of the main area MSA may be at least about 90. Accordingly, many features of the exemplary embodiment illustrated in FIG. 8 may be similar to the exemplary embodiments in FIG. 16.

A liquid crystal display according to exemplary embodiments of the invention will be described with reference to FIG. 17 and FIG. 18.

Figure 17:
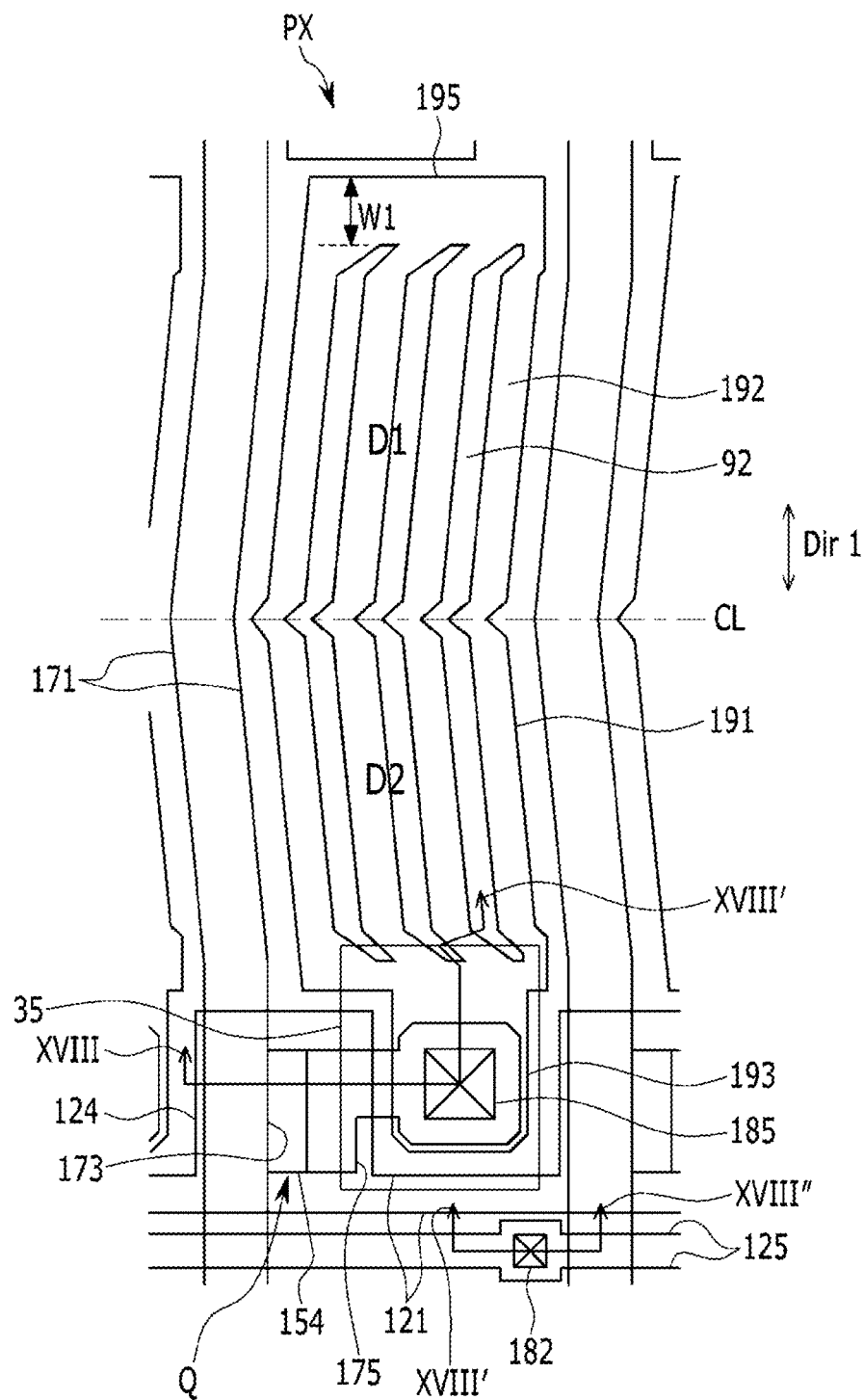
FIG. 17 is a layout view of a liquid crystal display according to exemplary embodiments of the present invention.

FIG. 17 is a layout view of the liquid crystal display. FIG. 18 is a cross-sectional view taken along line XVIII-XVIII'-XVIII" of the liquid crystal display of FIG. 17.

The liquid crystal display is similar to the exemplary embodiments illustrated in FIG. 1 and FIG. 2 described above, but further includes a common voltage line 125 transferring a common voltage to the common electrode 131. The common voltage line 125 may be positioned on the same layer as the gate line 121, and may be formed with the same material as the gate line 121. The common voltage line 125 may extend to be substantially parallel to the gate line 121, and may be adjacent to the gate line 121.

Figure 18:
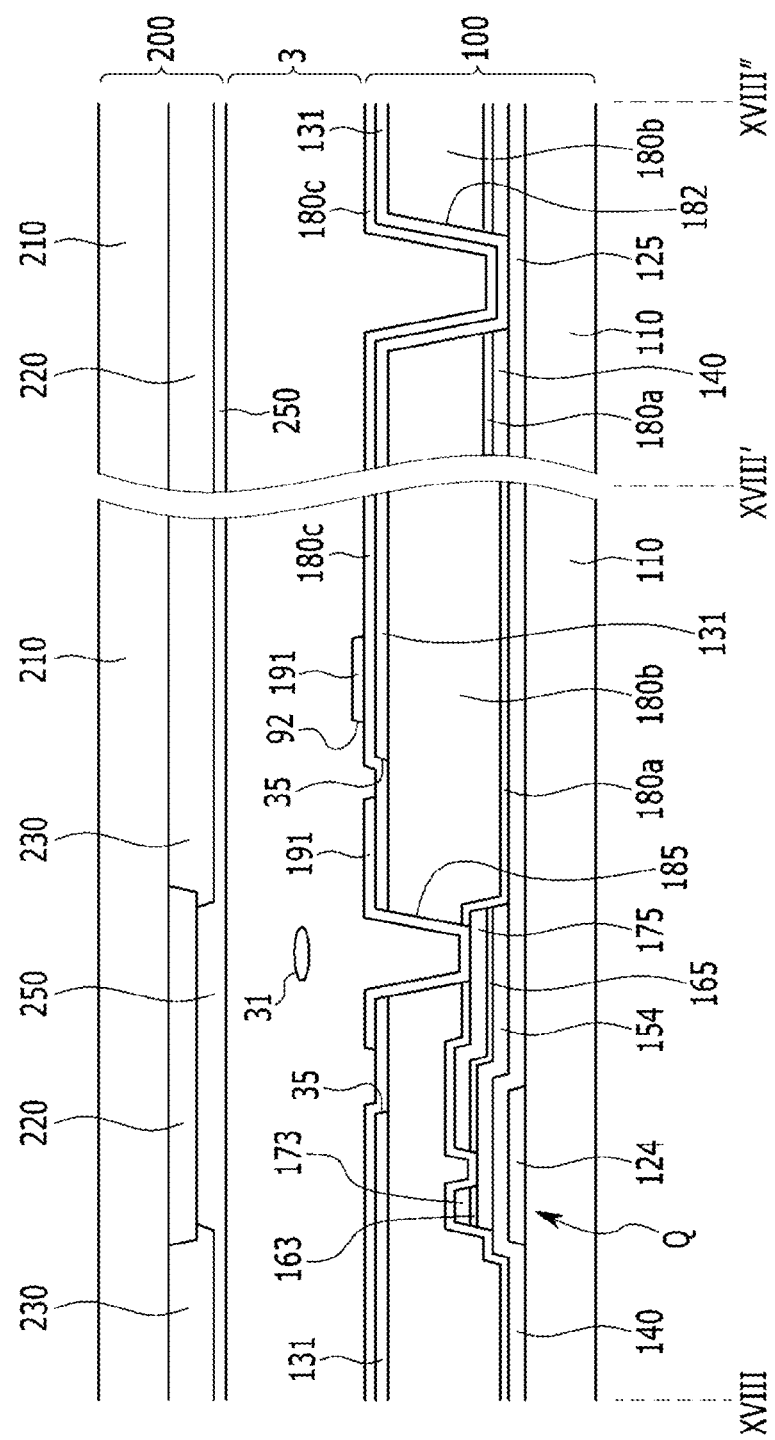
FIG. 18 is a cross-sectional view taken along line XVIII-XVIII'-XVIII" of the liquid crystal display of FIG. 12.

Referring to FIG. 18, the gate insulating layer 140 and the passivation layers 180a and 180b may include a contact hole 182 exposing the common voltage line 125. The common electrode 131 may be electrically and physically connected to the common voltage line 125 through the contact hole 182 to receive a common voltage from the common voltage line 125. The contact hole 182 may be positioned one by one for every at least one pixel PX. When the common electrode 131 receives the common voltage through the common voltage line 125 having low resistance, a display defect according to a voltage drop in the common electrode 131 may be prevented.

The common voltage line 125 may be applied to the liquid crystal displays illustrated in FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16 described above.

A liquid crystal display according to exemplary embodiments of the invention will be described with reference to FIG. 19 and FIG. 20 together with the drawings described above.

Figure 19:
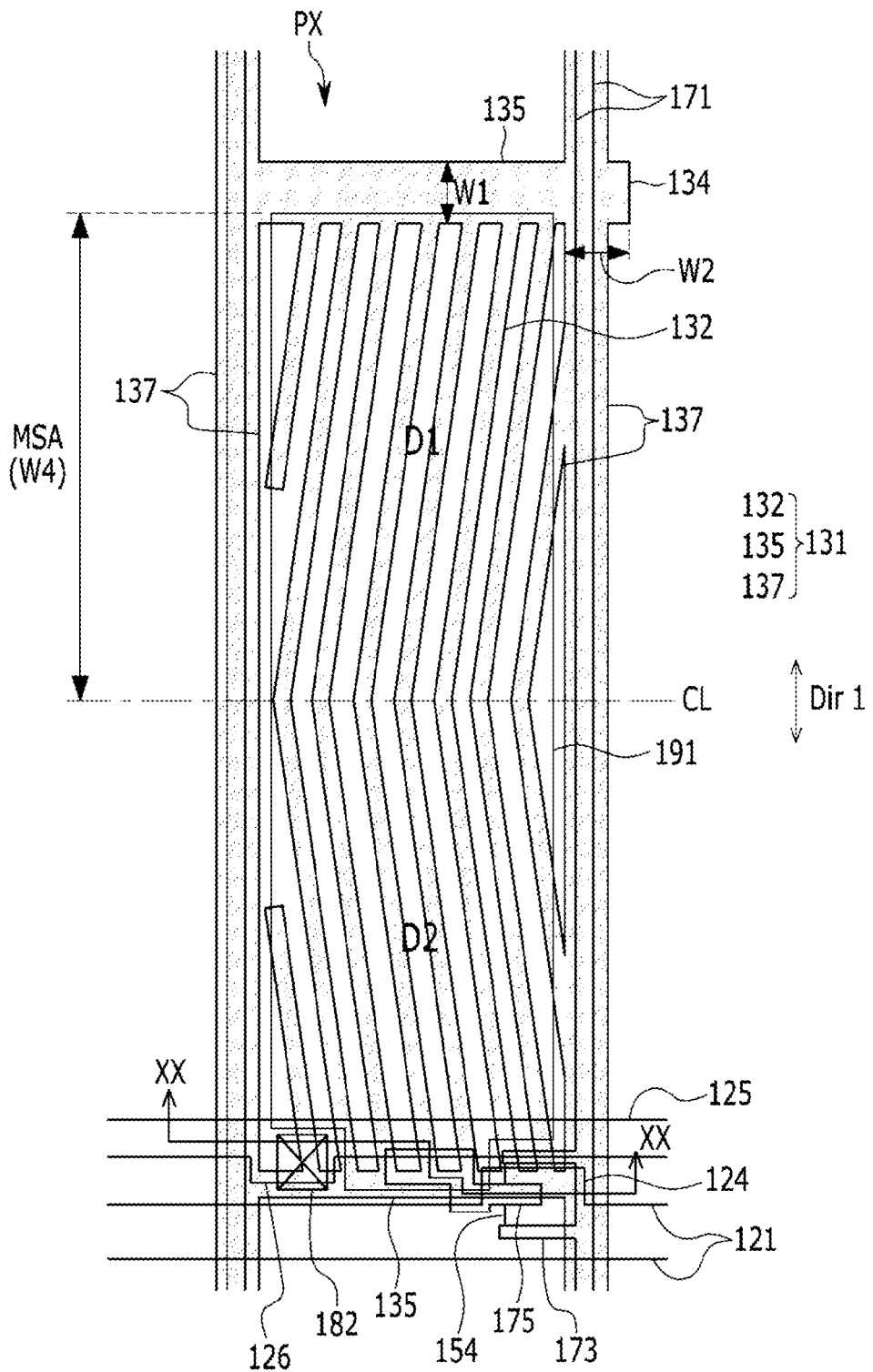
FIG. 19 is a layout view of a liquid crystal display according to exemplary embodiments of the present invention.

FIG. 19 is a layout view of the liquid crystal display. FIG. 20 is a cross-sectional view taken along line XX-XX of the liquid crystal display of FIG. 19.

Figure 20:
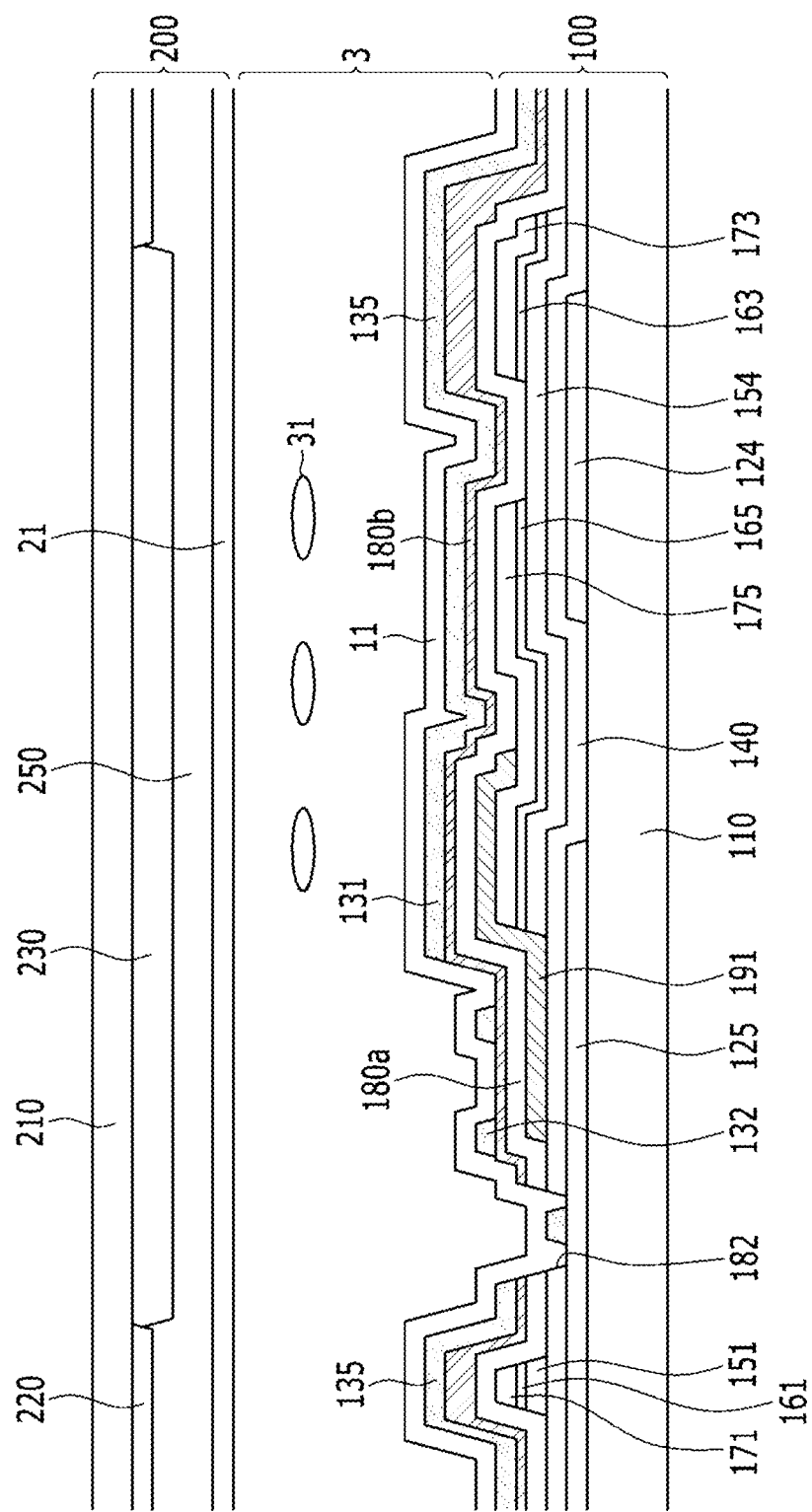
FIG. 20 is a cross-sectional view taken along line XX-XX of the liquid crystal display of FIG. 19.

The liquid crystal display in FIG. 19 and FIG. 20 is similar to the exemplary embodiments described above, but includes a data line 171 that is not bent in the first direction Dir1. Differences from the exemplary embodiments described above will be described.

When describing the lower panel 100, gate conductors, including a gate line 121, a gate electrode 124, and a common voltage line 125 including an extension 126 may be positioned on an insulation substrate 110. A gate insulating layer 140, a semiconductor stripe 151 including a semiconductor 154, and ohmic contacts 161, 163, and 165 may be sequentially formed on the lower panel 100. Data conductors including a data line 171, which includes a source electrode 173 and a drain electrode 175, may be formed on the ohmic contacts 161, 163, and 165. A pixel electrode 191 may be formed on the drain electrode 175. The pixel electrode 191 may cover and may directly contact a part of the drain electrode 175 to receive a data voltage from the drain electrode 175.

The overall shape of the pixel electrode 191 may be a rectangle having four sides which are substantially parallel to the gate line 121 and the data line 171, and may have a planar shape.

A passivation layer 180a and a second passivation layer 180b may be formed on the pixel electrode 191. The second passivation layer 180b may cover the data line 171 and may include a relatively thick portion formed along the data line 171. A dielectric constant of the second passivation layer 180b may be decreased and may be about 3.5 or less. A thickness of the second passivation layer 180b may be 0.5 μm to 3.0 μm. As the dielectric constant of the second passivation layer 180b is decreased, the thickness may be further decreased. The thick portion of the second passivation layer 180b may reduce a crosstalk between the data line 171 and the pixel electrode 191, and may reduce light leakage due to parasitic capacitance between the data line 171 and the adjacent pixel line 191. The parasitic capacitance between the data line 171 and the common electrode 131 may be decreased to reduce a signal delay of the data line 171.

A part of the common voltage line 125, for example, a contact hole 182 exposing the extension 126, may be formed in the gate insulating layer 140, the first passivation layer 180a, and the second passivation layer 180b.

A plurality of common electrodes 131 may be positioned on the second passivation layer 180b. The common electrode 131 positioned in each pixel PX may include a vertical portion 137 covering the data line 171, a plurality of branch electrodes 132 positioned between two vertical portions 137 and separated from each other, and a connection part 135 connecting ends of the plurality of branch electrodes 132. The common electrode 131 may receive a predetermined voltage, such as a common voltage from the common voltage line 125, through the contact hole 182.

In the upper panel 200, a light blocking member 220 and a color filter 230 may be formed on an insulation substrate 210, and an overcoat 250 may be formed on the color filter 230 and the light blocking member 220.

In the common electrode 131, an example to which many features of the common electrode 131 of the exemplary embodiment illustrated in FIG. 12, FIG. 13, FIG. 14, FIG. 15, and FIG. 16 described above are simultaneously applied is illustrated, but it is not limited thereto and at least one feature may be applied to one liquid crystal display. A width W1 of a first direction Dir1 of the connection part 135 of the common electrode 131 may be larger than a width of the branch electrode 132 and may be about 5 μm. A horizontal length W2 of the added wing 134 may be larger than a value acquired by adding about 2 μm to the width W1 of the connection part 135. In some cases if upper ends of the branch electrodes 132 are not connected with each other, the horizontal length W2 of the added wing 134 may be equal to or larger than a value acquired by adding about 1.5 μm to a width W3 of the branch electrode 132. A length W4 in the first direction Dir1 of the main area MSA may be larger than about 40 μm, and a value acquired by multiplying the width W1 of the upper connection part 135 by the length W4 in the first direction Dir1 of the main area MSA may be larger than about 90.

Alignment layers 11 and 21 may be coated on the insides of two display panels 100 and 200.

A liquid crystal display will be described with reference to FIG. 21 and FIG. 22 together with the drawings described above.

Figure 21:
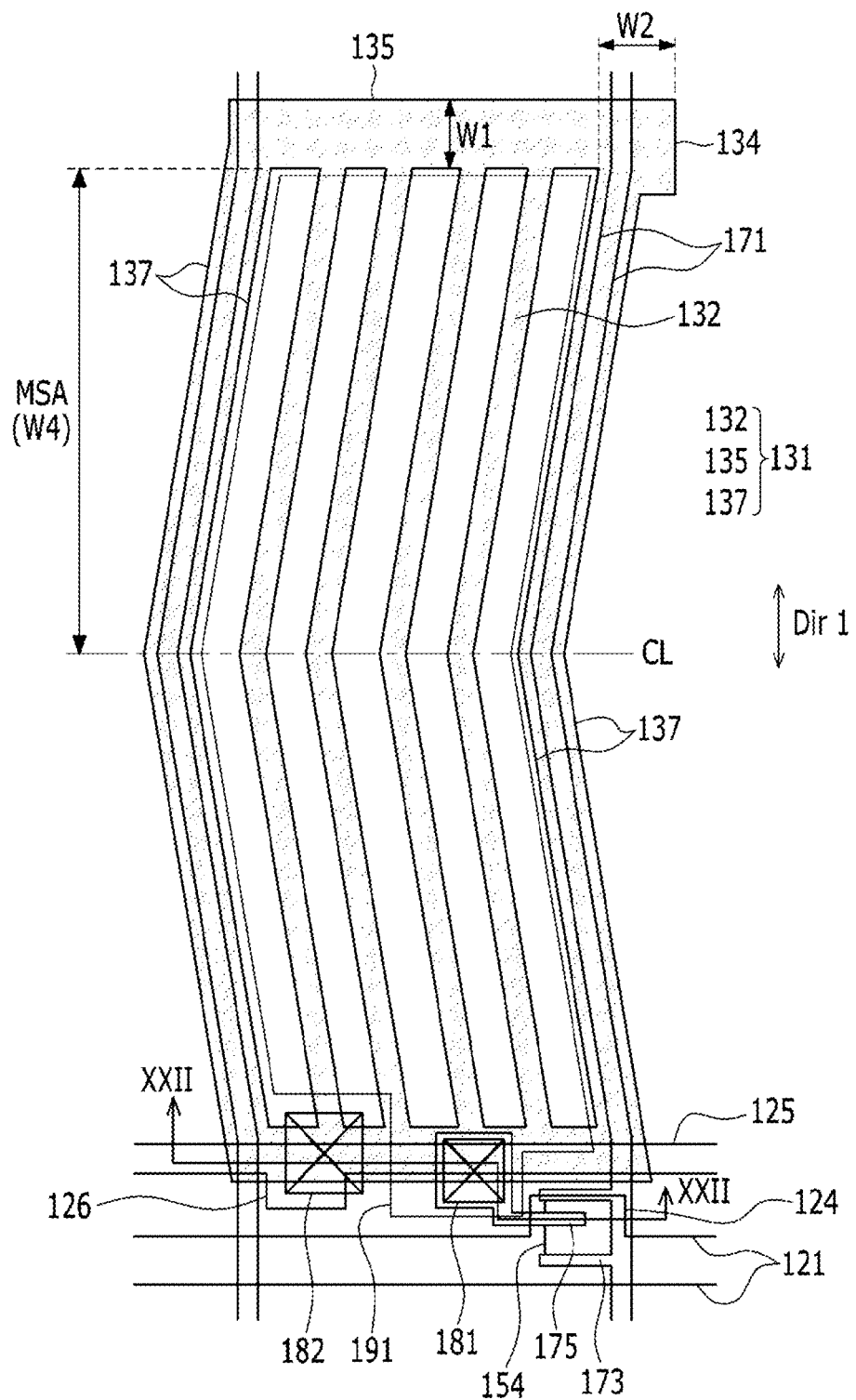
FIG. 21 is a layout view of a liquid crystal display according to exemplary embodiments of the present invention.

FIG. 21 is a layout view of a liquid crystal display. FIG. 22 is a cross-sectional view taken along line XXII-XXII of the liquid crystal display of FIG. 21.

Figure 22:
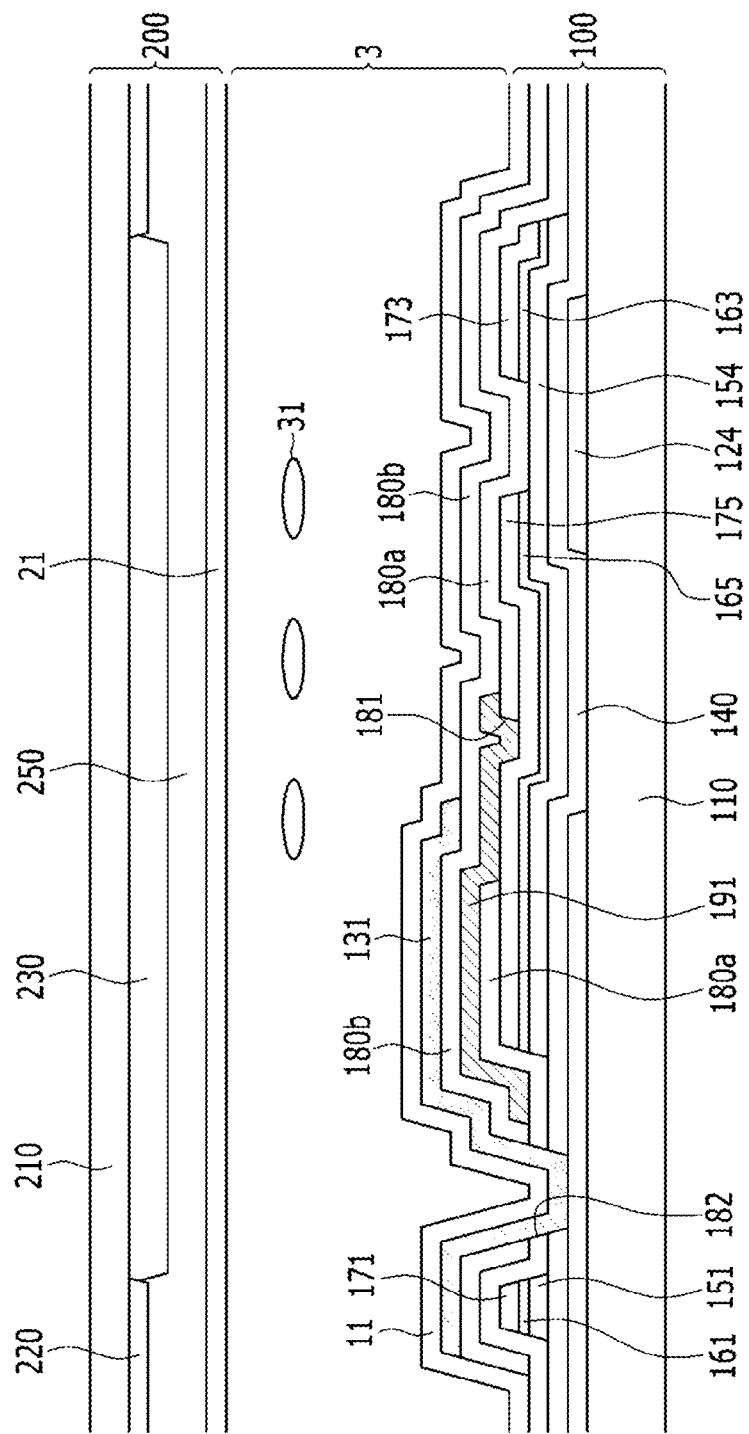
FIG. 22 is a cross-sectional view taken along line XXII-XXII of the liquid crystal display of FIG. 21.

The liquid crystal display in FIG. 21 and FIG. 22 may be similar to the exemplary embodiments of FIG. 19 and FIG. 20 described above, except that the data line 171 may be periodically bent in the first direction Dir1. A first passivation layer 180a may be formed on a data conductor and an exposed semiconductor 154, and a pixel electrode 191 may be formed on the first passivation layer 180a. The pixel electrode 191 may be electrically connected with a drain electrode 175 through a contact hole 181 of the first passivation layer 180a. A vertical side of the pixel electrode 191 may be bent along the data line 171 like the exemplary embodiments illustrated in FIG. 1 and FIG. 2 described above.

A second passivation layer 180b may be formed on the pixel electrode 191, and a common electrode 131 may be formed on the second passivation layer 180b.

A liquid crystal display will be described with reference to FIG. 23 and FIG. 24 together with the drawings described above.

Figure 23:
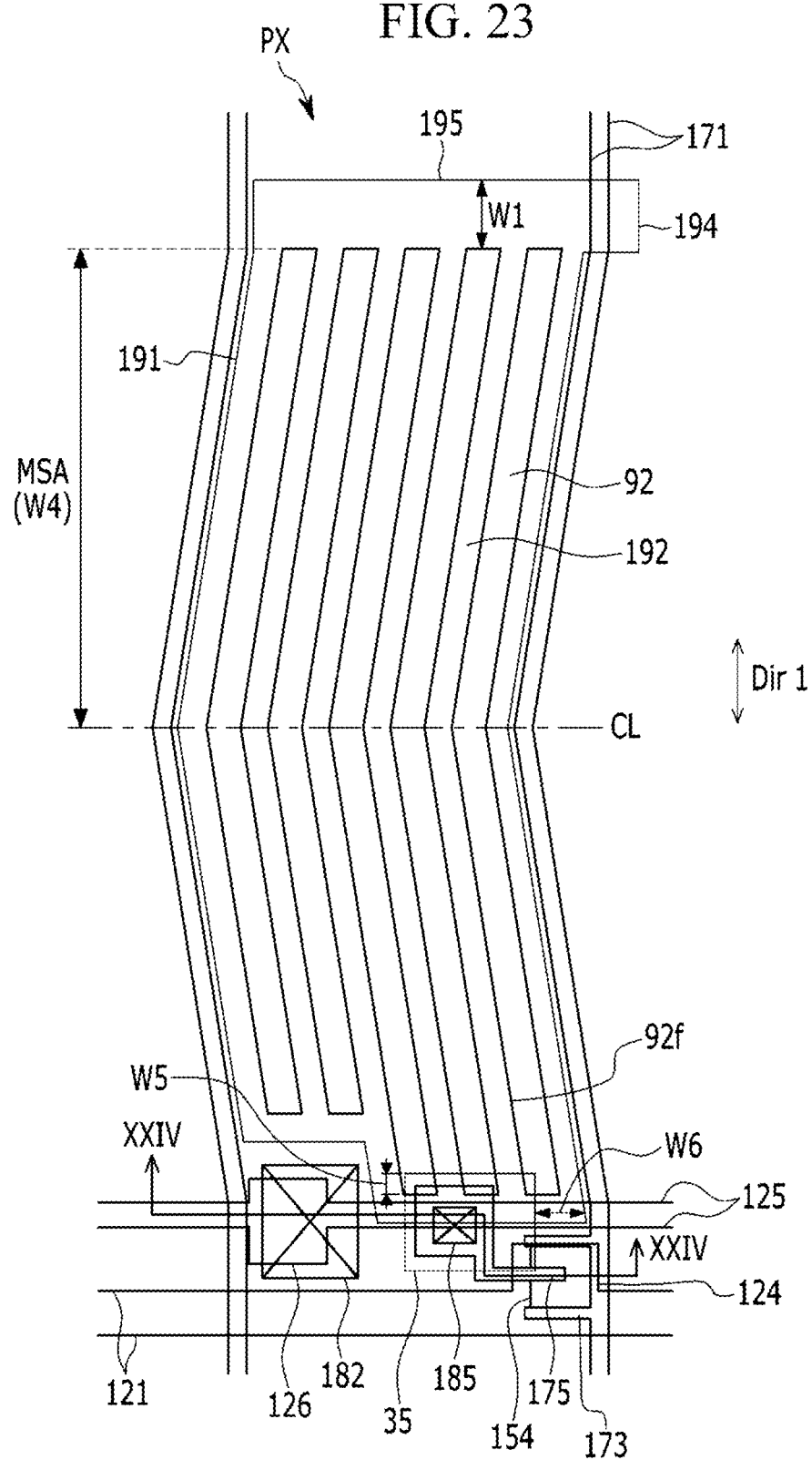
FIG. 23 is a layout view of a liquid crystal display according to exemplary embodiments of the present invention.

FIG. 23 is a layout view of a liquid crystal display. FIG. 24 is a cross-sectional view taken along line XXIV-XXIV of the liquid crystal display of FIG. 23.

Figure 24:
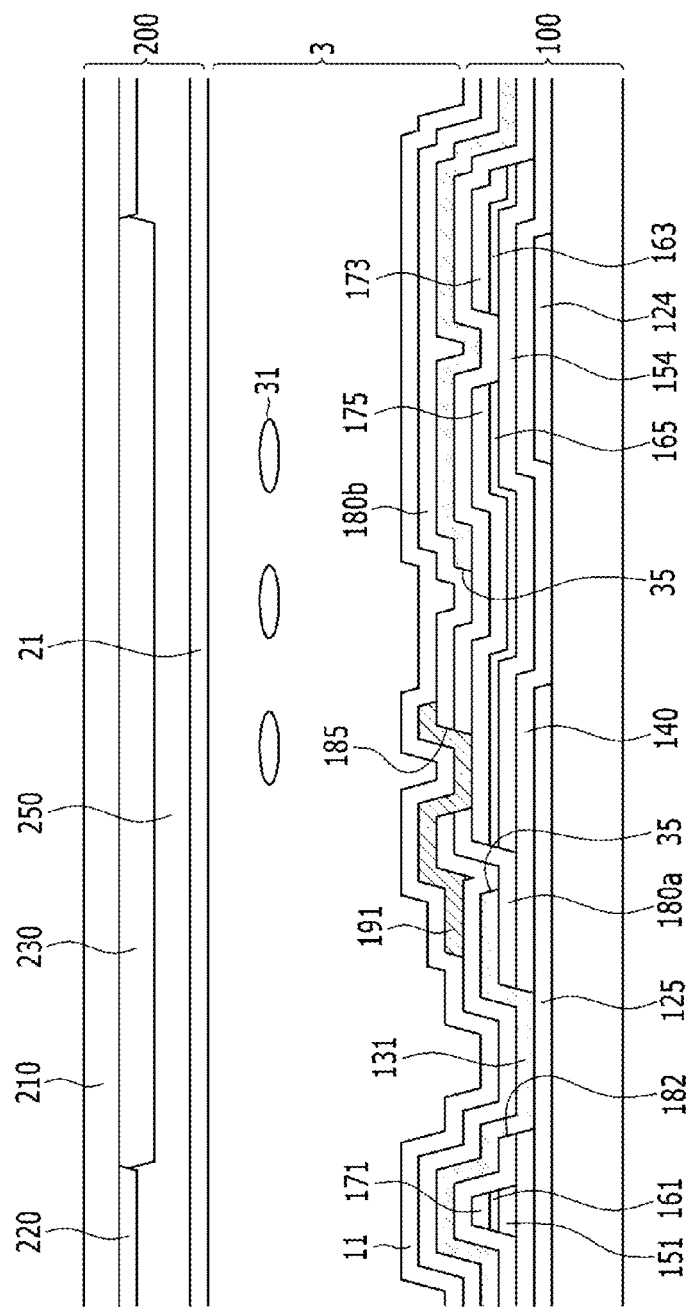
FIG. 24 is a cross-sectional view taken along line XXIV-XXIV of the liquid crystal display of FIG. 23.

The liquid crystal display in FIG. 23 and FIG. 24 may be similar to the exemplary embodiments illustrated in FIG. 21 and FIG. 22 described above, except a laminated order of the common electrode 131 and the pixel electrode 191 may be different.

A gate line 121 and a common voltage line 125, a gate insulating layer 140, semiconductors 151 and 154, ohmic contacts 161, 163, and 165, a data line 171, and a drain electrode 175 may be sequentially positioned on an insulation substrate 110 of the lower panel 100.

For example, a first passivation layer 180a may be formed on the data line 171, and a common electrode 131 may be formed on the first passivation layer 180a. The first passivation layer 180a and the gate insulating layer 140 may include a contact hole 182 exposing an extension 126 of the common voltage line 125, and the common electrode 131 may be electrically connected with the common voltage line 125 through the contact hole 182. The common electrode 131 may, in some cases, have a planar shape, for example, a plate-like shape, throughout the plurality of pixels PX.

A second passivation layer 180b may be formed on the common electrode 131, and a pixel electrode 191 may be formed on the second passivation layer 180b. The pixel electrode 191 may be electrically connected with the drain electrode 175 through a contact hole 185 of the first passivation layer 180a and the second passivation layer 180b. The pixel electrode 191 may include a plurality of branch electrodes 192 and a connection part 195 connecting ends of the branch electrodes 192.

A distance W5 from the bottom of a slit 92 of the pixel electrode 191 to a side of the hole 35 of the common electrode 131, that is, an upper side of the hole 35, may be about 10 μm or less, or a distance W6 from a right side of the pixel electrode 191 to a side of the hole 35 of the common electrode 131 closest to the right side of the hole 35, may be about 10 μm or less. As a result, bruising may be reduced. In the exemplary embodiments illustrated in FIG. 23, the upper side of the hole 35 of the common electrode 131 may be positioned above the bottom of the slit 92 of the pixel electrode 191 facing each other. Accordingly, bruising generated by texture portions at a lower left corner and a lower right corner of the pixel electrode 191 as a seed may be reduced.

A liquid crystal display according to exemplary embodiments of the invention will be described with reference to FIG. 25.

Figure 25:
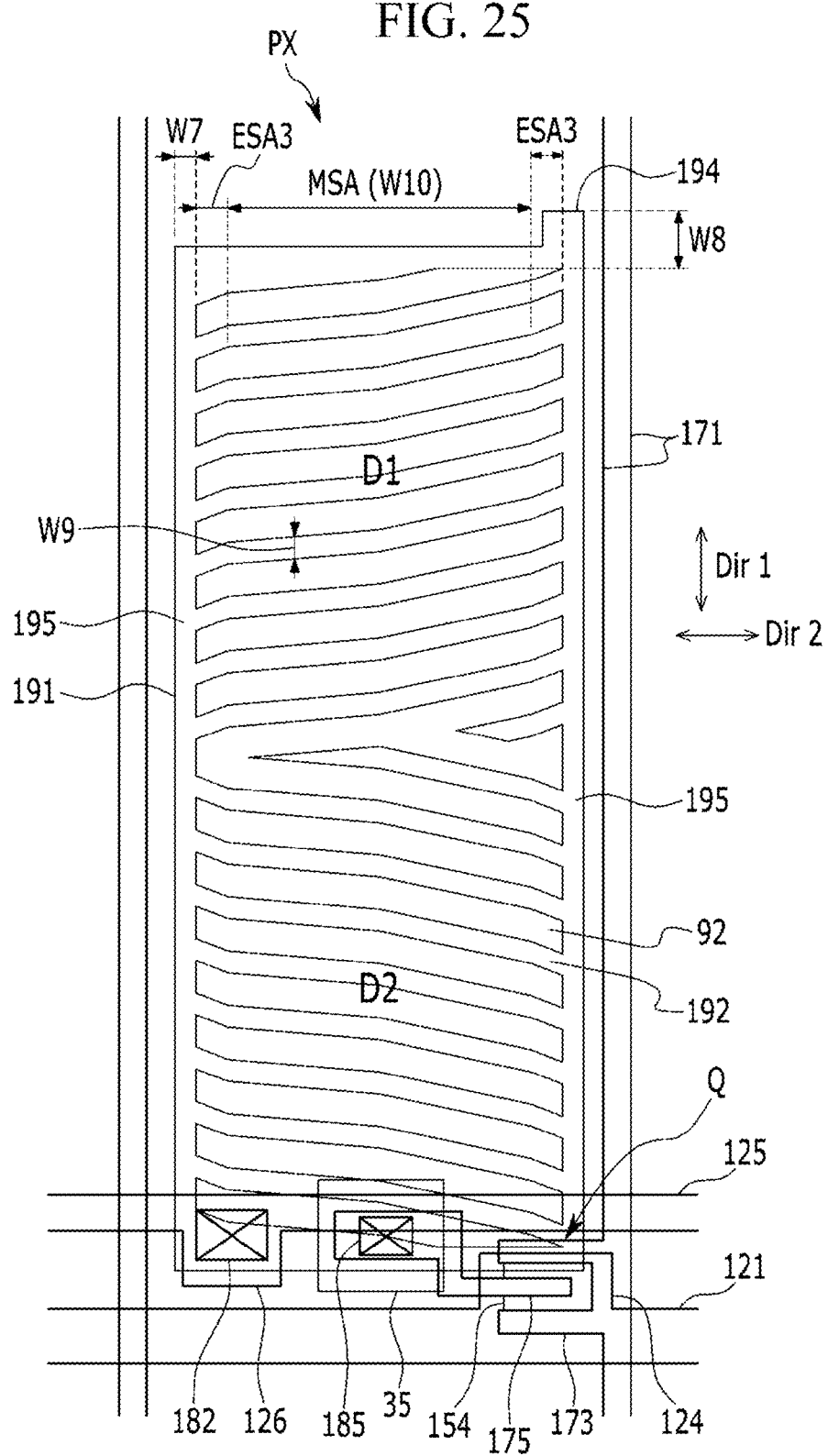
FIG. 25 is a layout view of a liquid crystal display according to exemplary embodiments of the present invention.

FIG. 25 is a layout view of a liquid crystal display.

The liquid crystal display in FIG. 25 may be similar to the exemplary embodiments described above, except that the branch electrodes 192 and 132 of the pixel electrode 191 or the common electrode 131 may substantially extend in a second direction Dir2 (e.g., a horizontal direction), which is perpendicular to the first direction Dir1. A rubbing direction or a photo-alignment direction of the alignment layer may be substantially parallel to the second direction Dir2, and the liquid crystal molecules 31 may be initially aligned to be substantially parallel to the second direction Dir2 without an electric field.

The pixel electrode 191 may include a plurality of branch electrodes 192 overlapped with a plane-shaped common electrode (not illustrated), and slits 92 may be formed between the branch electrodes 192. The branch electrode 192 may be inclined to form an oblique angle with the second direction Dir2. Angles between the branch electrodes 192 and the second direction Dir2 may be different from each other relative to a horizontal center line CL. Accordingly, the pixel electrode 191 may be divided into a first domain D1 and a second domain D2 having different alignment directions of the liquid crystal molecules 31. Each branch electrode 192 and each slit 92 may be bent near a left edge or a right edge to be divided into one main area MSA and edge areas ESA3 positioned at the left and right of the main area MSA, as illustrated in FIG. 25.

A left end and a right end of the branch electrode 192 may be connected with each other through the connection part 195. A width W7 in the second direction Dir2 of the connection part 195 may be larger than the width of the branch electrode 192 and may be at least 5 μm.

The pixel electrode 191 may further include an added wing 194 connected to an upper right corner of the pixel electrode 191 to which the end of the slit 92 faces. A length W8 in the first direction Dir1 of the added wing 194 may be larger than a value acquired by adding about 2 μm to the width W7 of the connection part 195. In some cases, the width W7 of the connection part 195 may be larger than the width of the branch electrode 192, and, in some cases, the width W7 may not be larger the width of the branch electrode 192. In some cases, the width W7 of the connection part 195 may be substantially similar to the width of the branch electrode 192.

In some cases, one side connection part 195 of left and right connection parts 195 of the pixel electrode 191 may be omitted, and the added wing 194 may be connected to an upper right corner of the pixel electrode 191. The length W8 in the first direction Dir1 of the added wing 194 may be equal to or larger than a value acquired by adding about 1.5 μm to a width W9 of the branch electrode 192.

A length W10 in the second direction Dir2 of the main area MSA may be substantially larger than 40 μm, and a value acquired by multiplying the width W7 of the left and right connection parts 195 by the length W10 in the second direction Dir2 of the main area MSA may be larger than about 90.

The features according to exemplary embodiments of the invention may be applied to liquid crystal displays having various structures.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate;
   data lines on the first substrate; and
   a first electrode comprising:
      branch electrodes extending substantially in a first direction; and
      a wing connected to an end of a first branch electrode disposed at an outermost side among the branch electrodes,
   wherein:
   the first electrode is substantially disposed between adjacent data lines;
   adjacent first electrodes are spaced apart from one another with respect to a data line of the data lines;
   a first length between a side of a slit closest to the wing and a side of the wing is larger than a width of one of the branch electrodes, the slit being formed between two of the branch electrodes;
   the first electrode further comprises a connection part to connect ends of the branch electrodes; and
   the first length is larger than a value equivalent to adding about 2 μm to a width of the connection part, the width of the connection part is defined in a direction perpendicular to an extending direction of the connection part.

2. The liquid crystal display of claim 1, further comprising:
a second substrate facing the first substrate; and
a liquid crystal layer disposed between the first substrate and the second substrate,
wherein:
the slit is inclined toward a first side of the branch electrodes with respect to the first direction and forms an oblique angle with the first direction;
liquid crystal molecules in the liquid crystal layer are configured to be aligned in the first direction for at least a determined period of time; and
the first branch electrode is configured to be connected to the wing at the one end corresponding to an end of the first side.

3. The liquid crystal display of claim 2, wherein:
a length of the slit in the first direction is at least about 40 µm; and
a value equivalent to multiplying the width of the connection part by the length of the slit in the first direction is at least about 90.

4. The liquid crystal display of claim 3, further comprising:
a thin-film transistor on the first substrate to transfer a data voltage to the first electrode;
a second electrode on the first substrate and overlapping the branch electrodes; and
an insulating layer disposed between the first electrode and the second electrode,
wherein:
the first electrode is disposed on the second electrode;
the insulating layer comprises a contact hole to connect the first electrode and the thin-film transistor;
the second electrode comprises a hole surrounding the contact hole; and
a distance from a bottom of the slit to a first side of the hole closest to a bottom of the slit is at most about 10 µm.

5. The liquid crystal display of claim 4, wherein:
a distance from an edge of a first side of the first electrode to a second side of the hole closest to the edge of the first side of the first electrode is at most about 10 µm.

6. The liquid crystal display of claim 2, wherein:
the slit comprises:
a main area forming a first angle with the first direction; and
an edge area forming a second angle with the first direction, the second angle being larger than the first angle, the edge area being smaller than the main area;
a length of the slit in the first direction of the main area is at least about 40 µm; and
a value equivalent to multiplying the width of the connection part by the length of the slit in the first direction of the main area is at least about 90.

7. The liquid crystal display of claim 6, further comprising:
a thin-film transistor on the first substrate to transfer a data voltage to the first electrode; and
an insulating layer disposed between the first electrode and a second electrode,
wherein:
the first electrode is disposed on the second electrode;
the insulating layer comprises a contact hole to connect the first electrode and the thin-film transistor;
the second electrode comprises a hole surrounding the contact hole; and
a distance from a curved point between the main area and the edge area of the slit to a first side of the hole closest to the curved point is at most 10 µm.

8. The liquid crystal display of claim 7, wherein:
a distance from an edge of the first side of the first electrode to a second side of the hole closest to the edge is at most about 10 µm.

9. The liquid crystal display of claim 1, wherein
the width of the connection part is larger than a width of each of the branch electrodes.

* * * * *